United States Patent [19]
Kress et al.

[11] Patent Number: 5,192,398
[45] Date of Patent: Mar. 9, 1993

[54] COKE BOX WITH INDIRECTLY COOLED RECEIVING CHAMBER AND EXHAUST GAS BURNER

[75] Inventors: Edward S. Kress, Brimfield; Gene C. Carpenter, Galesburg, both of Ill.

[73] Assignee: Kress Corporation, Brimfield, Ill.

[21] Appl. No.: 664,330

[22] Filed: Mar. 4, 1991

Related U.S. Application Data

[60] Division of Ser. No. 331,519, Mar. 30, 1989, Pat. No. 4,997,527, which is a continuation-in-part of Ser. No. 185,089, Apr. 22, 1988, Pat. No. 4,886,580, which is a continuation-in-part of Ser. No. 041,876, Apr. 22, 1987, abandoned.

[51] Int. Cl.$^5$ ............... C10B 39/02; C10B 39/12
[52] U.S. Cl. .................. 202/227; 202/228; 202/230; 202/263
[58] Field of Search ............ 202/227, 228, 230, 263

[56] References Cited

U.S. PATENT DOCUMENTS

| | | | |
|---|---|---|---|
| 3,728,230 | 4/1973 | Kemmetmueller . | |
| 3,748,235 | 7/1973 | Pries | 202/227 |
| 4,248,671 | 2/1981 | Belding | 202/228 |
| 4,257,849 | 3/1981 | Nijhawan et al. . | |
| 4,285,772 | 8/1981 | Kress | 202/227 |

FOREIGN PATENT DOCUMENTS

| | | |
|---|---|---|
| 164423 | 10/1905 | Fed. Rep. of Germany . |
| 279950 | 8/1913 | Fed. Rep. of Germany . |
| 436995 | 11/1926 | Fed. Rep. of Germany . |
| 498659 | 5/1930 | Fed. Rep. of Germany . |
| 716291 | 9/1977 | U.S.S.R. . |
| 859415 | 8/1981 | U.S.S.R. . |
| 1323563 | 7/1987 | U.S.S.R. . |
| 1351964 | 11/1987 | U.S.S.R. . |
| 183113 | 4/1923 | United Kingdom . |
| 1559324 | 1/1980 | United Kingdom . |

OTHER PUBLICATIONS

Kress Corporation Brochure, "KIDC–Coke Production/Emission Control System", Jul. 31, 1983.

*Primary Examiner*—Joye L. Woodard
*Attorney, Agent, or Firm*—Leydig, Voit & Mayer

[57] ABSTRACT

A coke box for dry quenching and indirectly cooling a charge of coke received from the discharge end of a coke oven. The coke box includes a chamber for receiving the coke and a seal engageable with the discharge end of the oven to substantially prevent the escape of combustible gases and particulate matter therefrom. A door encloses the coke within the receiving chamber to substantially isolate the coke from the atmosphere and an external cooling media which is passed over the exterior surfaces of the receiving chamber to indirectly cool the charge of coke enclosed in the receiving chamber. A burner chamber is connected to the receiving chamber for burning combustible gases and particulate matter exhausted from the receiving chamber. Preferably, the burner includes a venturi tube and an air inlet nozzle for drawing atmospheric air into the burner to mix with the combustible gases and enhance the combustion thereof.

20 Claims, 31 Drawing Sheets

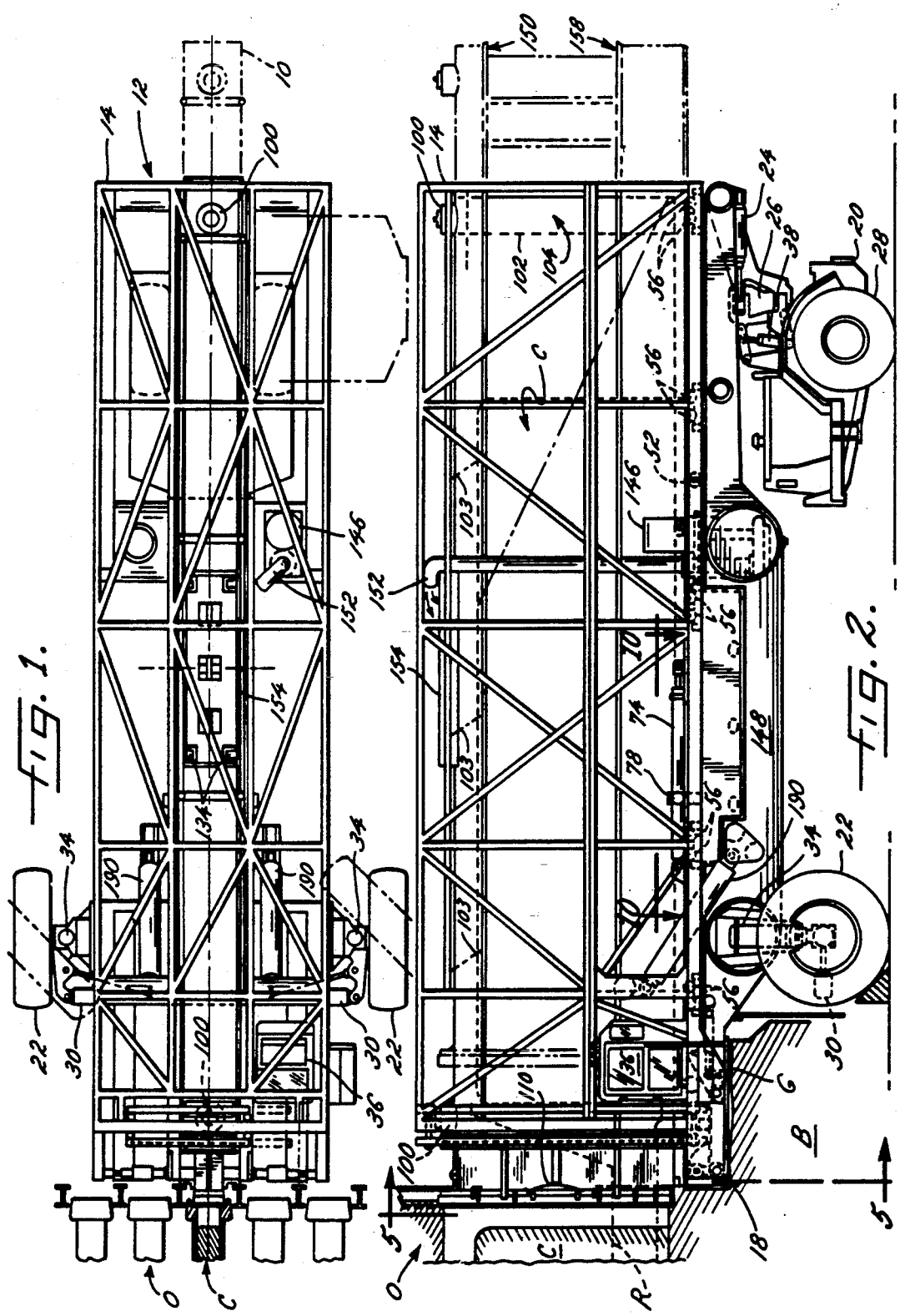

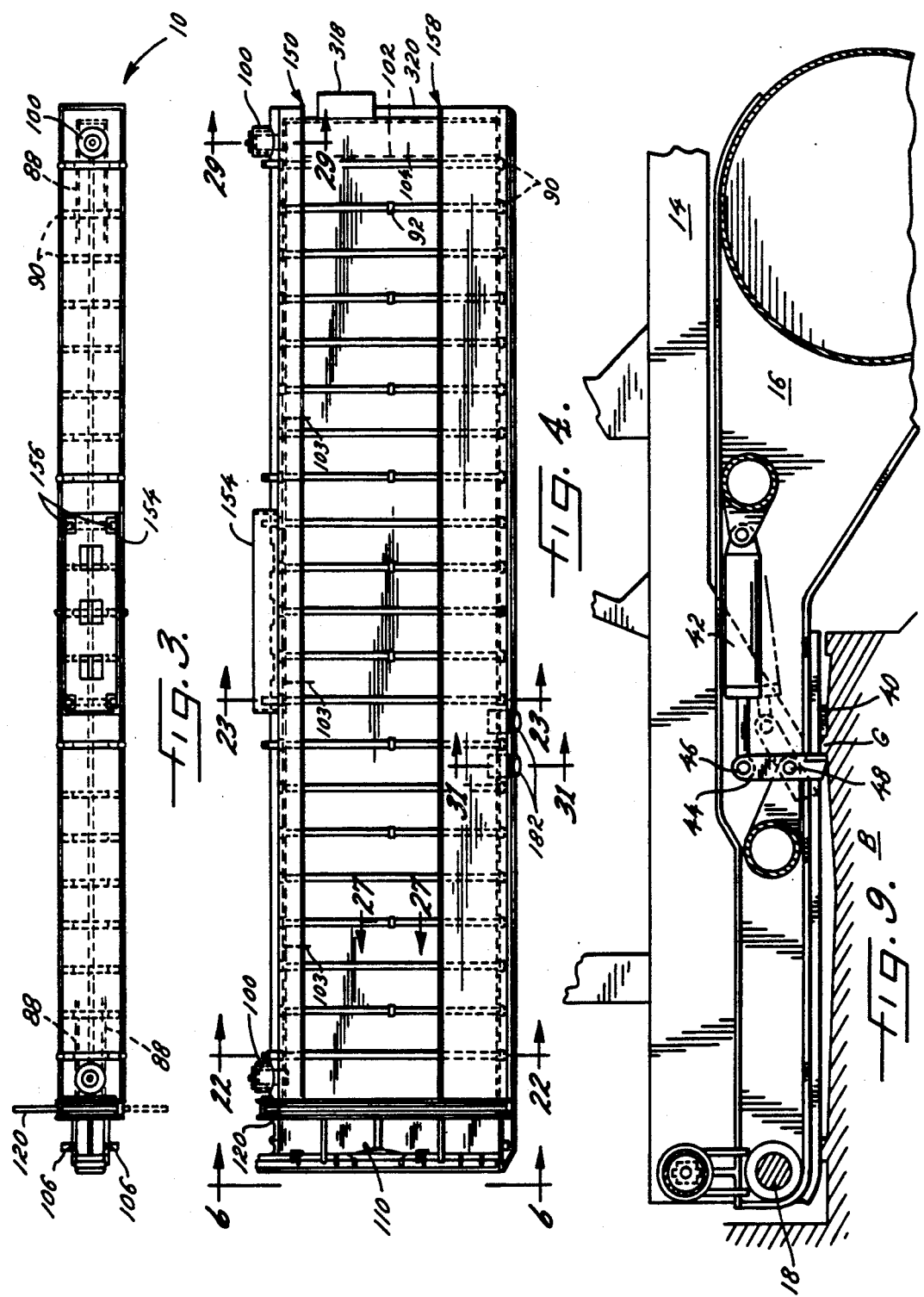

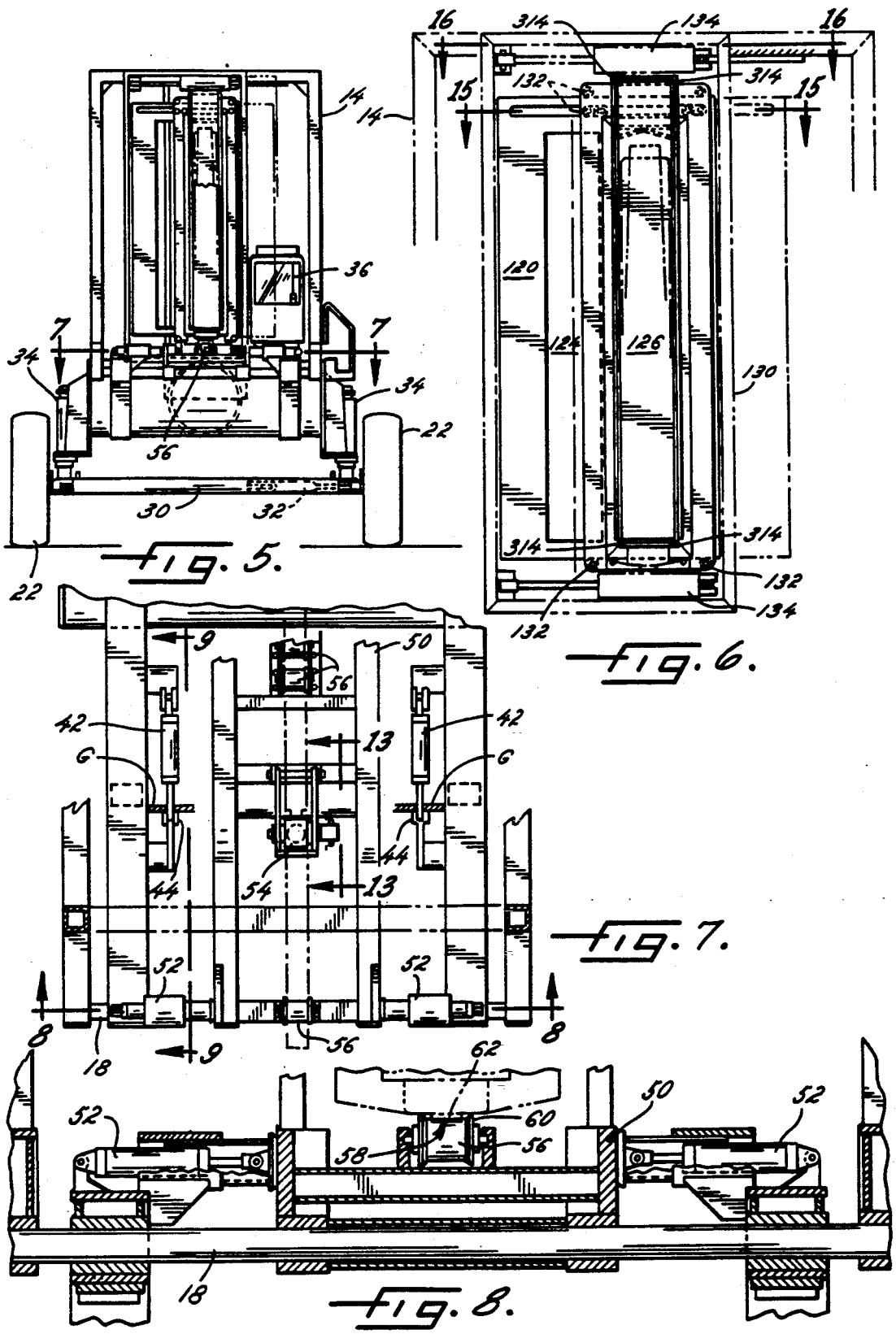

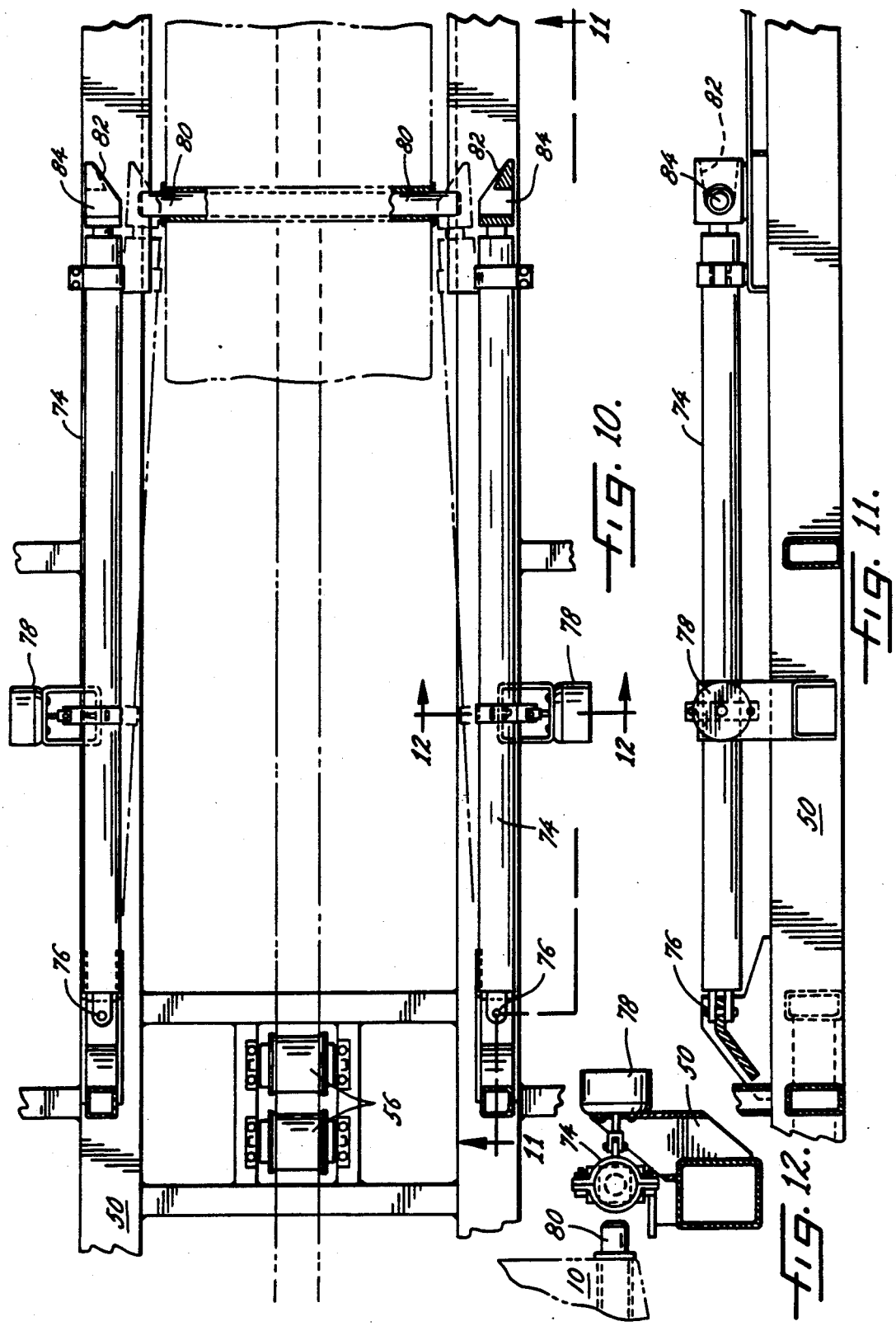

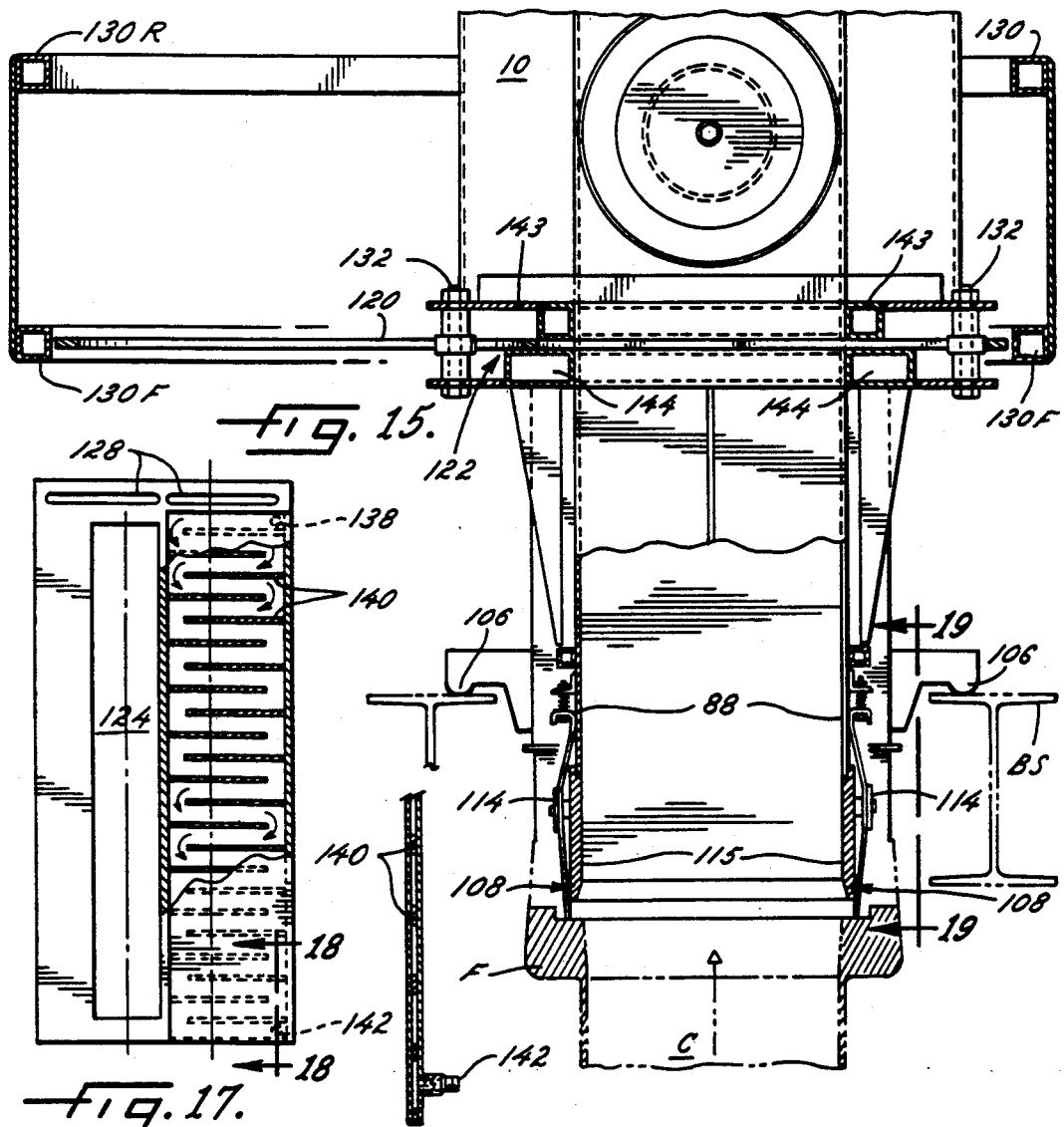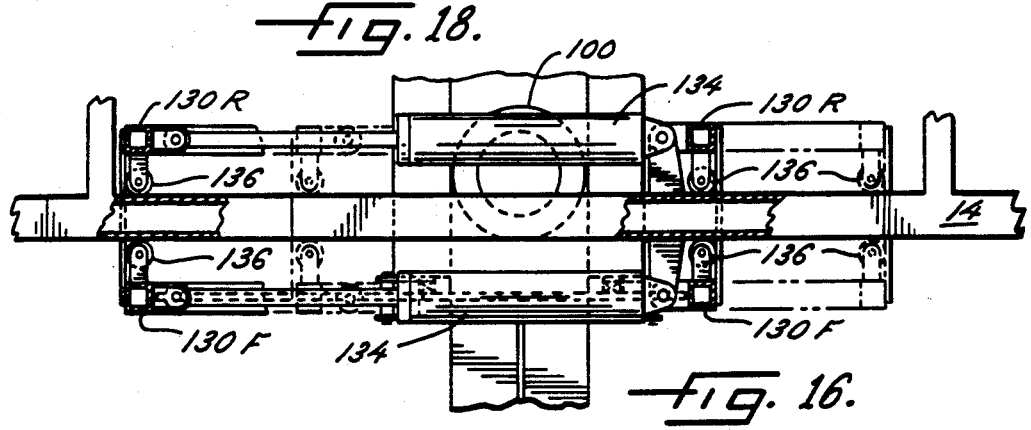

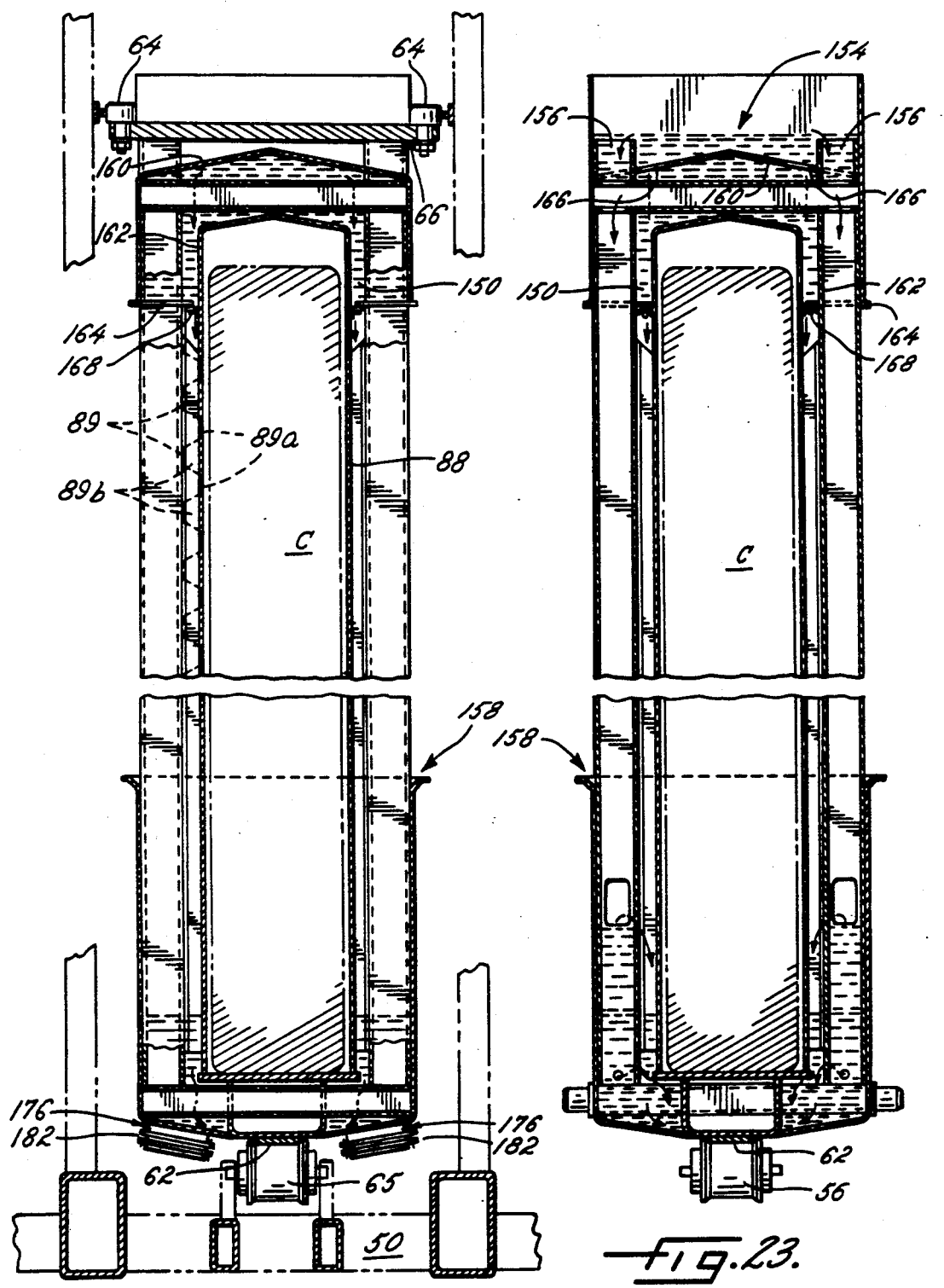

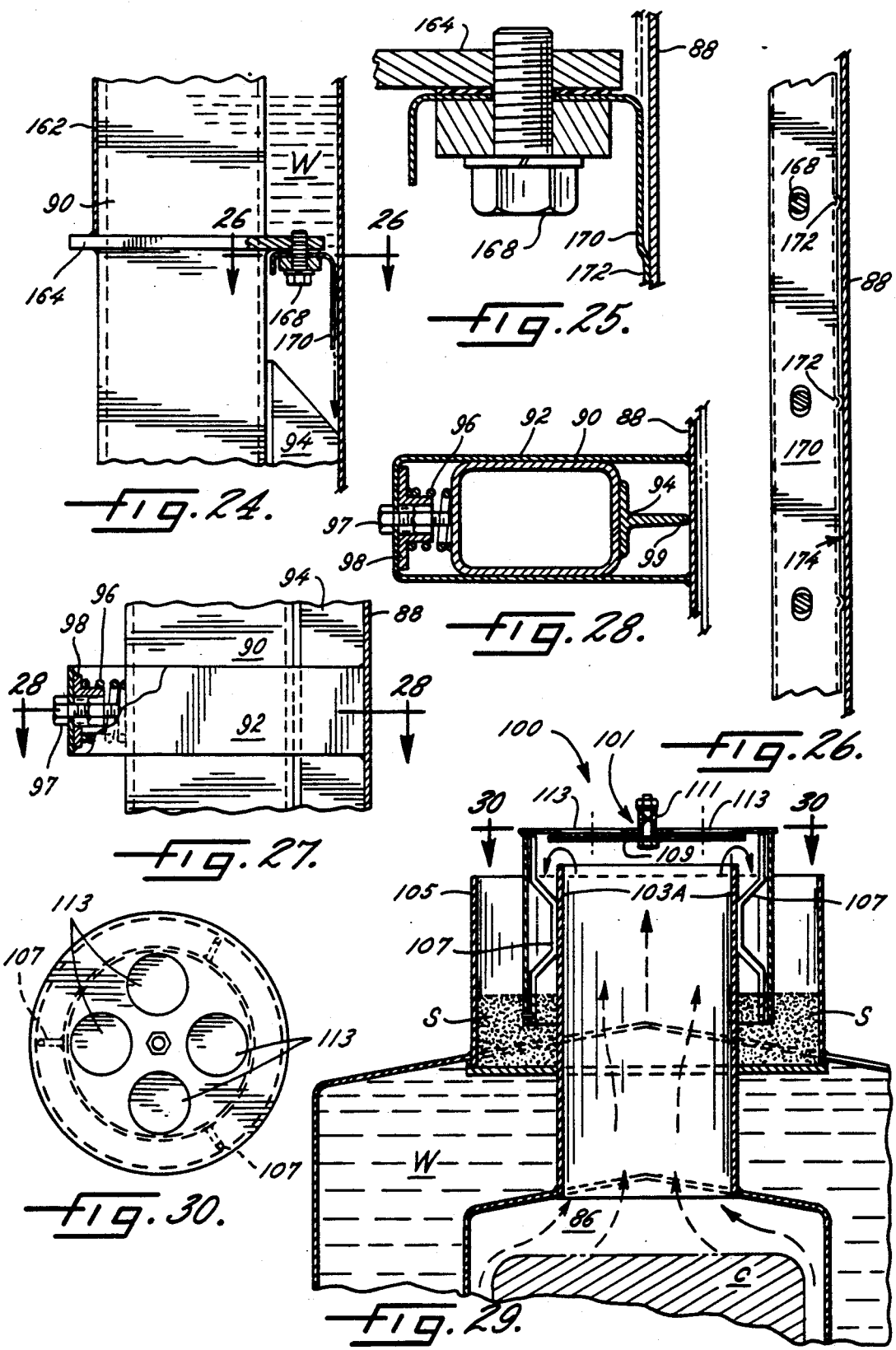

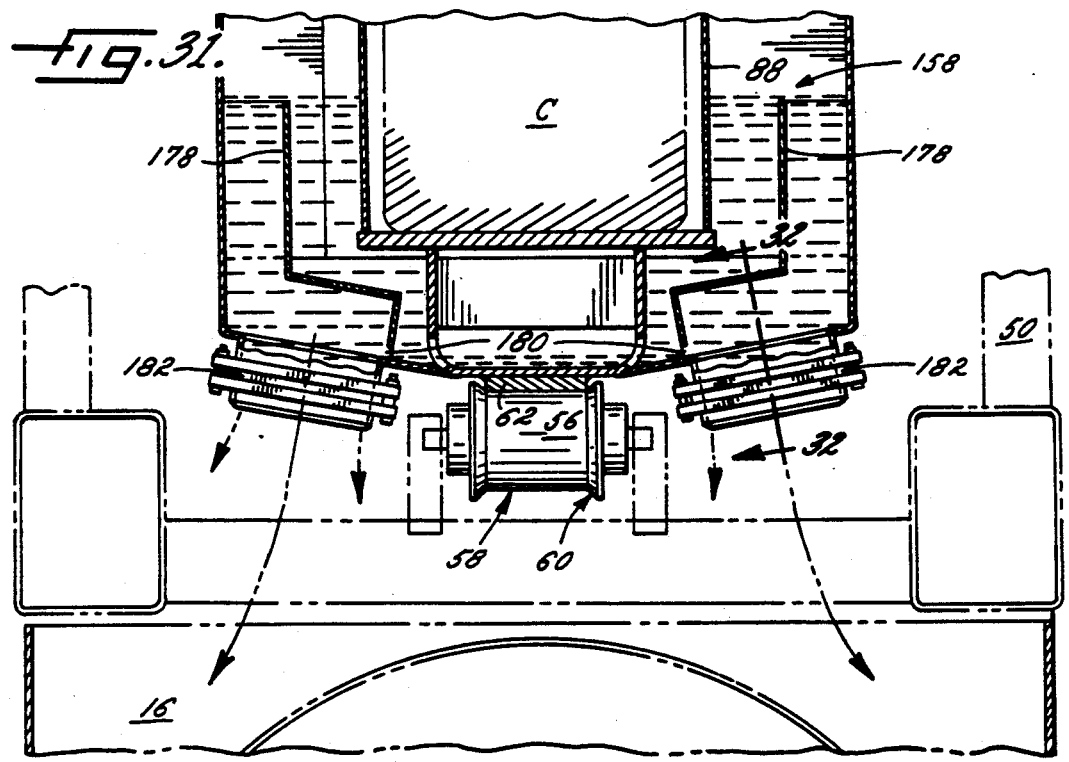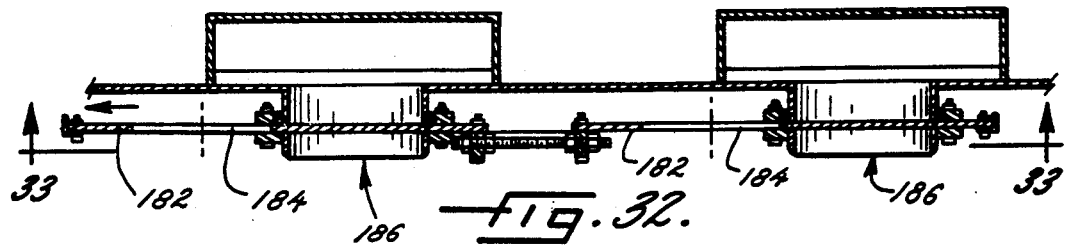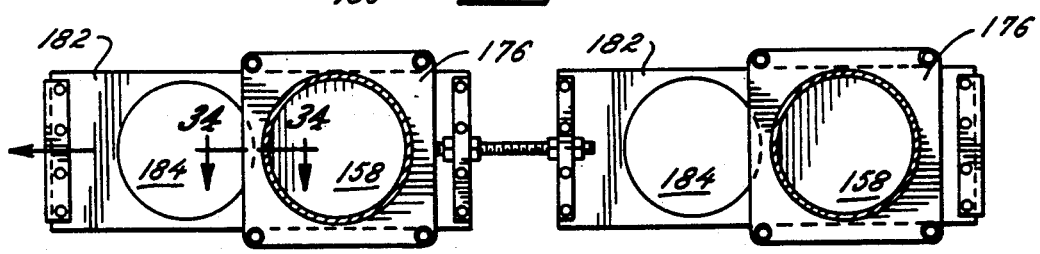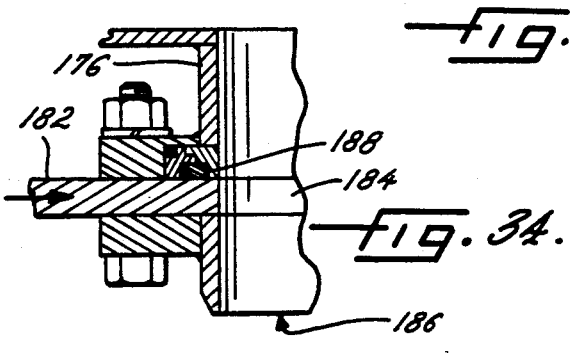

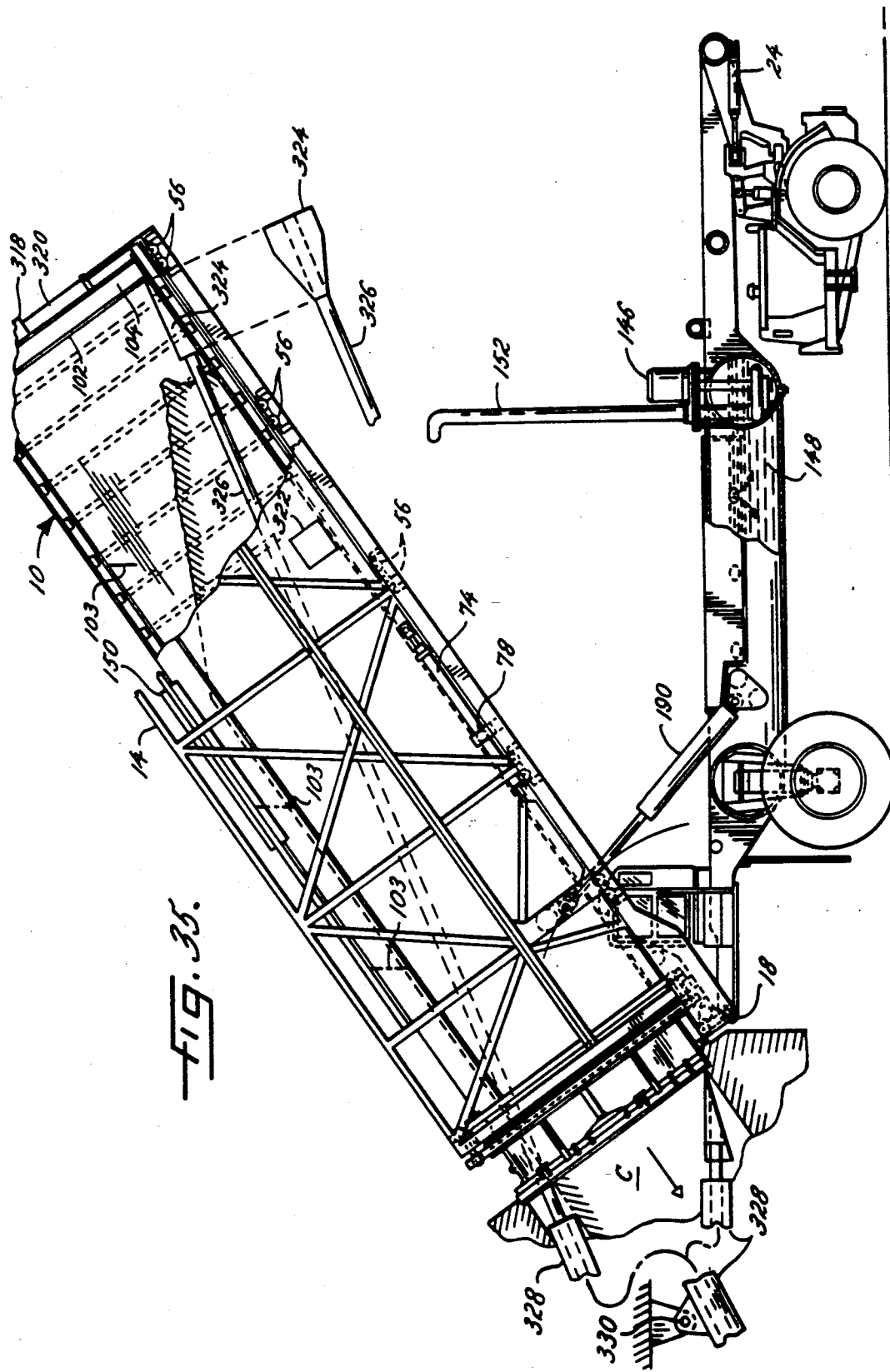

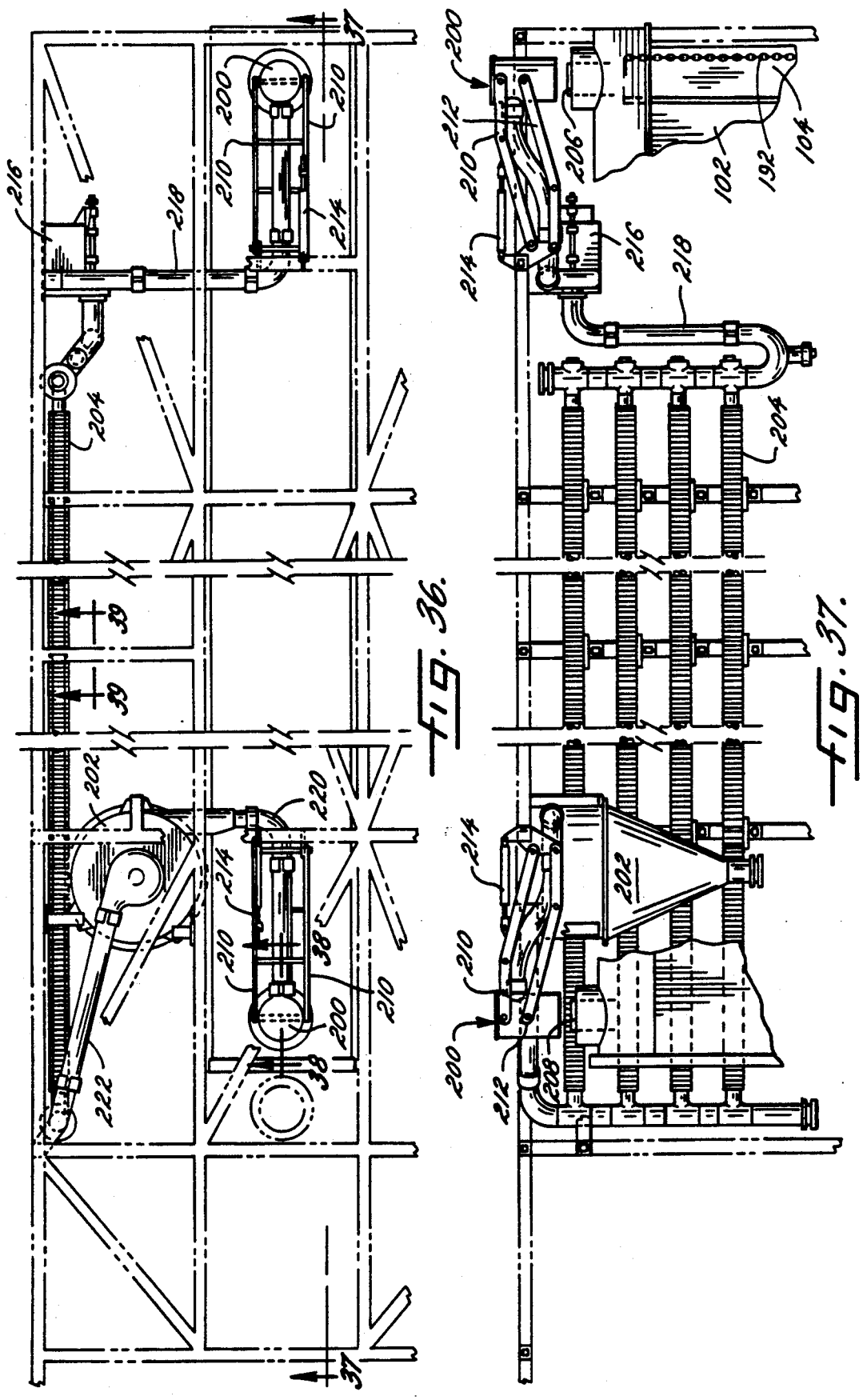

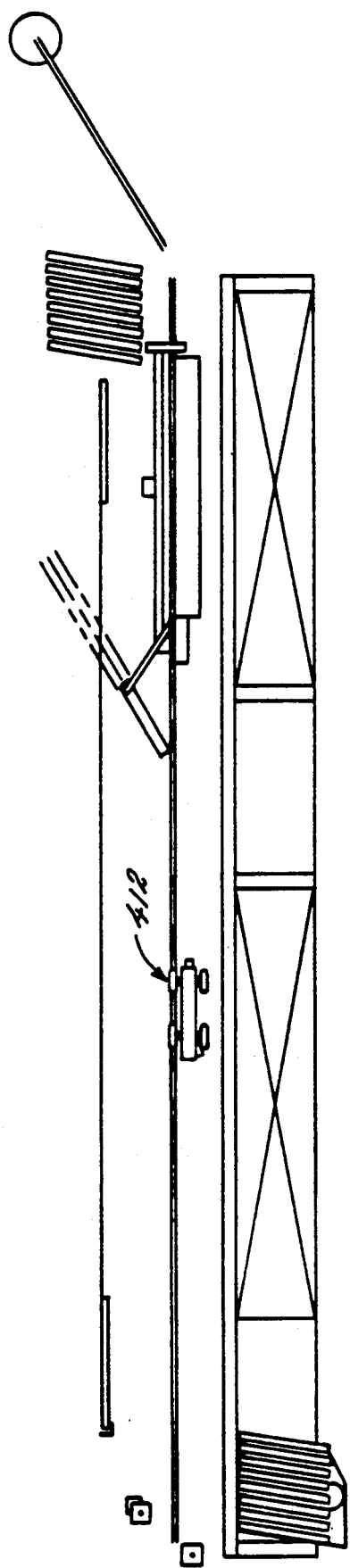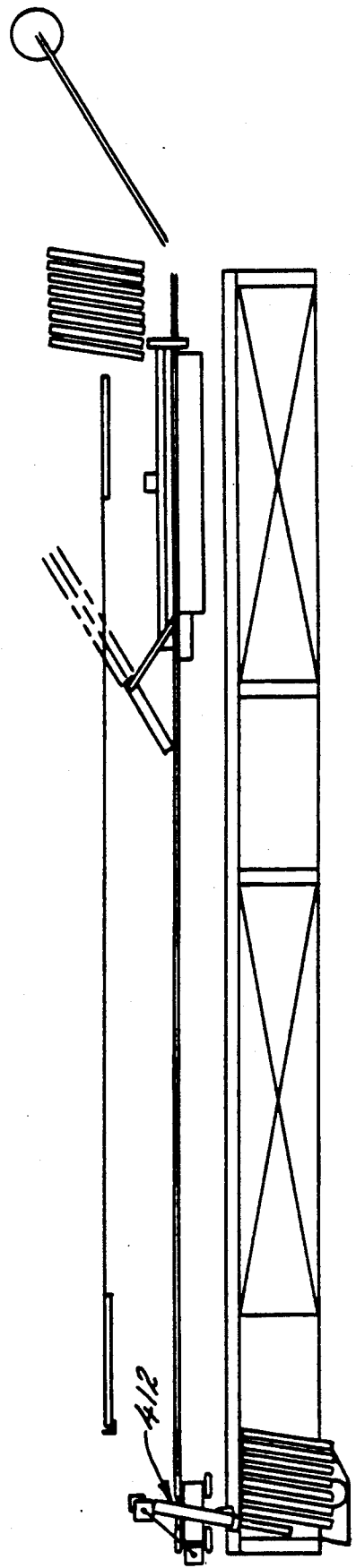
FIG. 44a
FIG. 44b

COKE BOX WITH INDIRECTLY COOLED RECEIVING CHAMBER AND EXHAUST GAS BURNER

RELATED APPLICATIONS

This application is a division of application Ser. No. 331,519, filed Mar. 30, 1989, now U.S. Pat. No. 4,997,527, which is a continuation-in-part of application Ser. No. 185,089, filed Apr. 22, 1988, now U.S. Pat. No. 4,886,580, which is a continuation-in-part of application Ser. No. 041,876, filed Apr. 22, 1987, now abandoned.

FIELD OF THE INVENTION

The present invention relates generally to a system for dry quenching coke and more particularly concerns a coke box used for transporting and dry quenching the hot coke and a specialized vehicle for picking up and transporting the coke box.

BACKGROUND OF THE INVENTION

When coal is cooked in very high temperature ovens in the absence of oxygen, the heat transforms the coal into coke which is then used as a fuel in blast furnaces to produce steel. After the coal has been turned into coke by the "coking process," it must be cooled before being sized for use in the blast furnaces. In conventional coking operations, the hot coke cake is expelled by a ram into hopper cars open to the atmosphere where it ignites and continues burning until the hot coke is quenched, typically by running the cars through a water bath to lower its temperature below the kindling temperature.

Several problems result from conventional coking operations. First, expelling the hot coke into the hopper cars pulverizes and breaks the semi-rigid coke cake into chunks smaller than the minimum acceptable size for use in the blast furnace operation. Secondly, the burning coke causes a loss of valuable coke and causes air pollution from the combustion fumes.

Quenching the burning coke with large quantities of water creates additional problems. For example, a major disadvantage with water quenching is that the wet coke has a substantially lower heating value than dry coke. Further, there is significant air pollution from the dust particles and chemicals that are carried into the atmosphere with steam that is formed when the water strikes the hot coke. Not only is the water polluted by the coke, but the coke itself is polluted by chemicals in the waste water that is typically reused in the quenching process. Finally, the quenching operation itself causes the coke to break up, further pulverizing and degrading the quality of the coke.

There have been numerous attempts by others to overcome some or all of the general problems associated with conventional wet quenching, some dating back to the nineteenth century. Approaches have included receiving the coke in substantially cake form, following by either direct or indirect water quenching. An example of the former is U.S. Pat. No. 3,748,235 to Pries, while examples of the latter are German Patent 279,950 and U.S. Pat. No. 4,285,772 to Kress. There have been several proposals involving the use of inert cooling gas to quench hot coke in closed containers. Examples of such arrangements are shown in British Patent 183,113 (1923), in German Patent 436,995 and in the Kress patent referenced above.

The Kress patent discloses a system employing a trackless, steerable vehicle which is adaptable for either grass roots coking operations or existing coke oven batteries. The present invention presents improvements on the basic system and vehicle disclosed in U.S. Pat. No. 4,285,772.

OBJECTS OF THE INVENTION

It is an object of the present invention to provide an improved coke box and system for manipulating the coke box.

It is a further object of the present invention to provide an improved coke box carrier vehicle with increased maneuverability.

A more specific object is to provide a carrier vehicle which can manipulate the coke box in order to accurately align it with the oven with a minimum amount of maneuvering of the carrier vehicle itself.

Still another general object is to provide a water cooling system which may be used either on the carrier vehicle or a remote cooling rack. Similarly, it is an object to provide an internal gas circulation system which may also be used either on the carrier vehicle or a remote cooling rack to transfer the heat from the coke and to cool sides of the box.

A more detailed object is to prevent the gases inside the box before the push from being displaced back over and around the coke into the oven as the coke is pushed into the box, generating pollution up the standpipe and back through the oven. This object is satisfied by relieving the pressure in the rear of the box and burning any gases and particulate matter as it egresses from the box through a valve exit duct. The system of the present invention also has the ability to burn off gases after the push that are generated from the coke before it cools. On occasion large quantities of gases are generated when the coke is not fully coked or still "green". Without this system, undesirable pressure could be generated inside the box and these undesirable gases could then later escape downstream even after the coke egresses from the receiving station.

It is a further object to provide an improved coke handling system which permits an empty coke box to be quickly and accurately located at a coke oven to receive a push of coke and then to transport it to a cooling station where the hot coke box is off loaded and a cool coke box is picked up for transport to a sealed receiving station where the cooled coke is discharged for delivery to a storage area before the cooled empty coke box is returned to the next coke oven to receive a new coke charge, all within a minimum cycle time on the order of only a few minutes.

A related, yet important, object is to insure that the coke box remains substantially sealed from the atmosphere at the coke oven while taking a push. After the push, the box is effectively sealed during transport and cooling until the coke is deposited into the sealed receiving station, to substantially eliminate the discharge of undesirable gases and particulate matter into the atmosphere.

A still further objective of the system of the invention involves the ability of the vehicle to remove the oven door, clean the door, clean the door jamb and replace the door all without moving the carrier from its position in front of the oven.

Yet another object is to provide a single transport, support and guide rail beneath the mechanism and two in-line steel wheels mounted rigidly to the carrier to guide the carrier back and forth in front of the ovens, control the rear height of the carrier and take reaction of the friction force generated when the coke is pushed into the box.

It is also a very important object of the invention that the carrier is suspended by struts that can lift the rail wheels off the rail to allow the carrier to travel independently of the rail when the carrier is to be removed for maintenance so the carrier will not be restricted by obstruction at the end of the coke batteries as would a conventional rail system. Even more important the struts on the oven side of the vehicle left the oven side of the vehicle carrier so the turntable will clear the bench when rotating over the bench and when the turntable is in position, the struts will lower the turntable onto the bench for vertical alignment.

These and other features and advantages of the invention will be more readily apparent upon reading the following description of a preferred exemplified embodiment of the invention and upon reference to the accompanying drawings wherein:

BRIEF DESCRIPTION OF THE DRAWINGS

FIG. 1 is a plan view of a coke box and carrier vehicle according to the present invention aligned with a coke oven and in position to receive a charge of coke;

FIG. 2 is a side elevational view of the coke box and the carrier vehicle of FIG. 1;

FIG. 3 is a plan view of the coke box of FIGS. 1 and 2;

FIG. 4 is a side elevational view of the coke box of FIGS. 1 and 2;

FIG. 5 is an elevational view of the same coke box and the carrier vehicle taken through the plane 5—5 in FIG. 2;

FIG. 6 is an enlarged, fragmentary elevational view of the same coke box and carrier vehicle taken through the plane 6—6 in FIG. 4;

FIG. 7 is an enlarged, fragmentary sectional view of the tilt frame shifting assembly taken through the plane 7—7 in FIG. 5;

FIG. 8 is an enlarged, fragmentary sectional view of the tilt frame shifting assembly taken through the plane 8—8 in FIG. 7;

FIG. 9 is an enlarged, fragmentary sectional view of a clamping assembly taken through the plane 9—9 in FIG. 7;

FIG. 10 is an enlarged, fragmentary sectional view of a coke box holding assembly taken through the plane 10—10 in FIG. 2;

FIG. 11 is an enlarged, fragmentary sectional view of the coke box holding assembly taken through the plane 11—11 in FIG. 10;

FIG. 12 is an enlarged, fragmentary sectional view of the coke box holding assembly taken through the plane 12—12 in FIG. 10;

FIG. 15 is an enlarged, fragmentary sectional view of the coke box engaging the coke oven taken through the plane 15—15 in FIG. 6;

FIG. 16 is an enlarged, fragmentary sectional view of a door shifting assembly taken through the plane 16—16 in FIG. 6;

FIG. 17 is front elevational view of a door plate;

FIG. 18 is an enlarged, fragmentary sectional view of the door plate taken through the plane 18—18 in FIG. 17;

FIG. 22 is an enlarged, fragmentary sectional view of an arrangement for cooling the coke box taken through the plane 22—22 in FIG. 4;

FIG. 23 is an enlarged, fragmentary sectional view of an arrangement for cooling the coke box taken through the plane 23—23 in FIG. 4;

FIG. 24 is an enlarged, fragmentary detailed view of an upper portion of FIG. 22 showing a water gap;

FIG. 25 is an enlarged, fragmentary, detail view of the water gap of FIG. 24;

FIG. 26 is an enlarged, fragmentary sectional view of the water gap taken through the plane 26—26 in FIG. 24;

FIG. 27 is an enlarged, fragmentary sectional view of coke ox wall tension bands taken through the plane 27—27 in FIG. 4;

FIG. 28 is an enlarged, fragmentary sectional view of the coke box wall tension bands taken through the plane 28—28 in FIG. 27;

FIG. 29 is an enlarged, fragmentary sectional view of coke box pressure vents taken through the plane 29—29 in FIG. 4;

FIG. 30 is an enlarged, fragmentary sectional view of coke box pressure vent taken along the plane 30—30 in FIG. 29;

FIG. 31 is an enlarged, fragmentary sectional view of a lower catch trough and drain weir of the cooling system taken through the plane 31—31 in FIG. 4;

FIG. 32 is an enlarged, fragmentary sectional view of gate valves taken through the plane 32—32 in FIG. 31;

FIG. 33 is an enlarged, fragmentary sectional view of the gate valves in a closed position taken through the plane 33—33 in FIG. 32;

FIG. 34 is an enlarged, fragmentary detailed sectional view of a gate valve shown in an open position taken through the plane 34—34 in FIG. 33;

FIG. 35 is a side elevational view showing the tilting of the coke box and carrier vehicle to empty a load of cooled coke at a coke crushing station;

FIG. 36 is a plan view of the tilt frame and the inert cooling gas system;

FIG. 37 is a side elevational view of the tilt frame and inert cooling gas system of FIG. 36;

FIGS. 43a-b, 44a-b, and 45a-b are schematic plan views of a preferred sequence of operation wherein the modified coke box carrier is shown;

Figure 46:
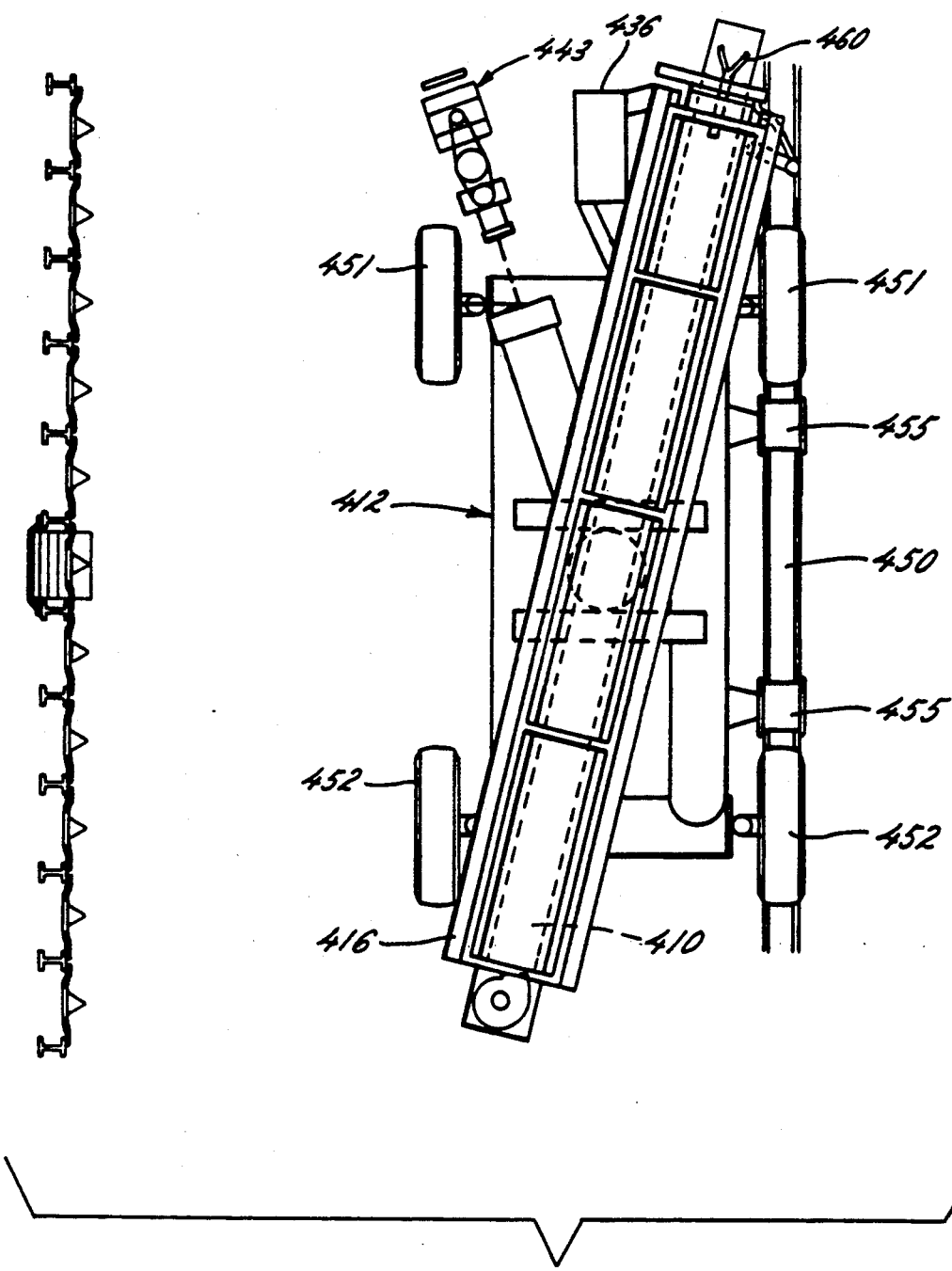
Figure 48:
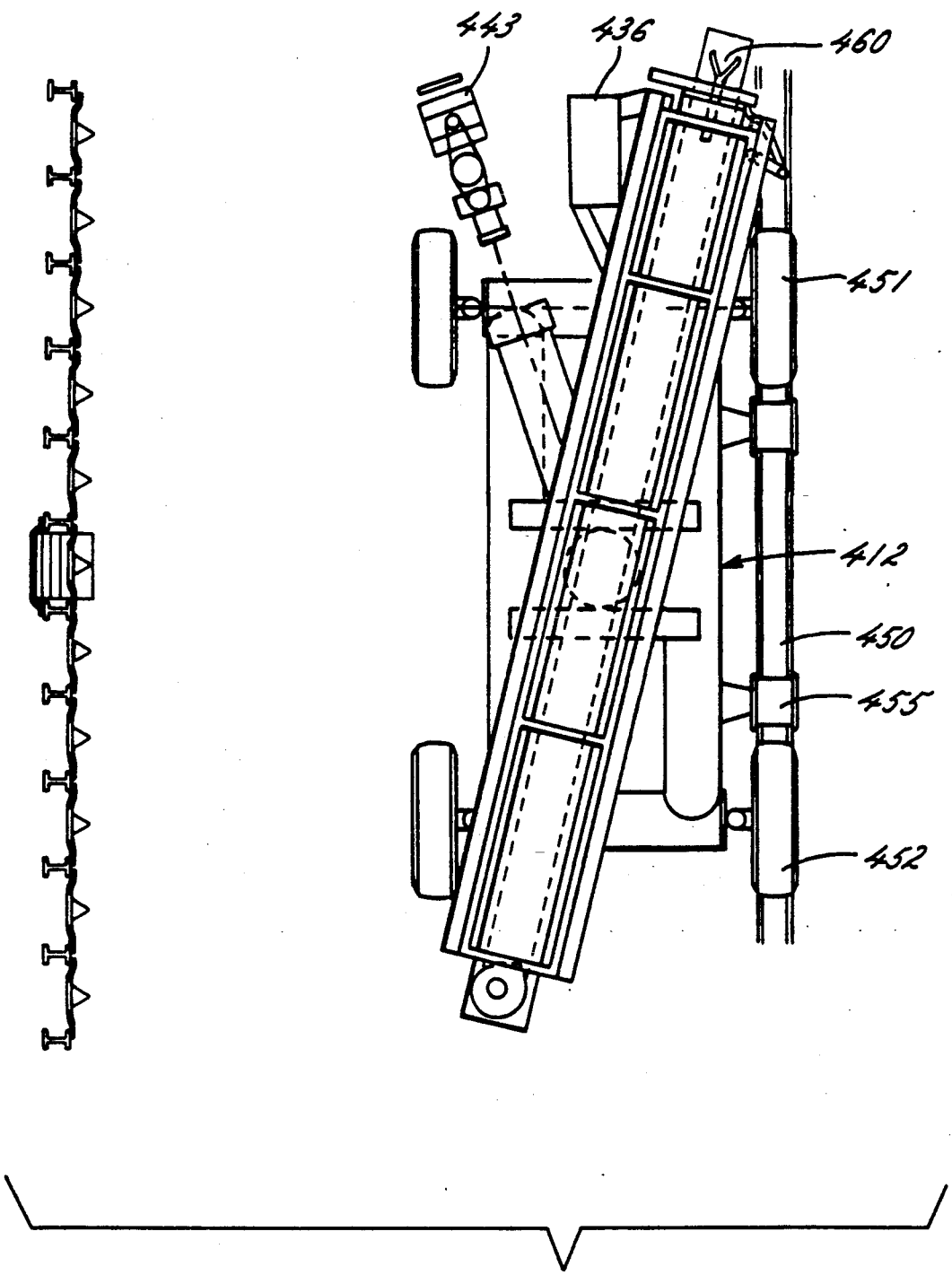
Figure 49:
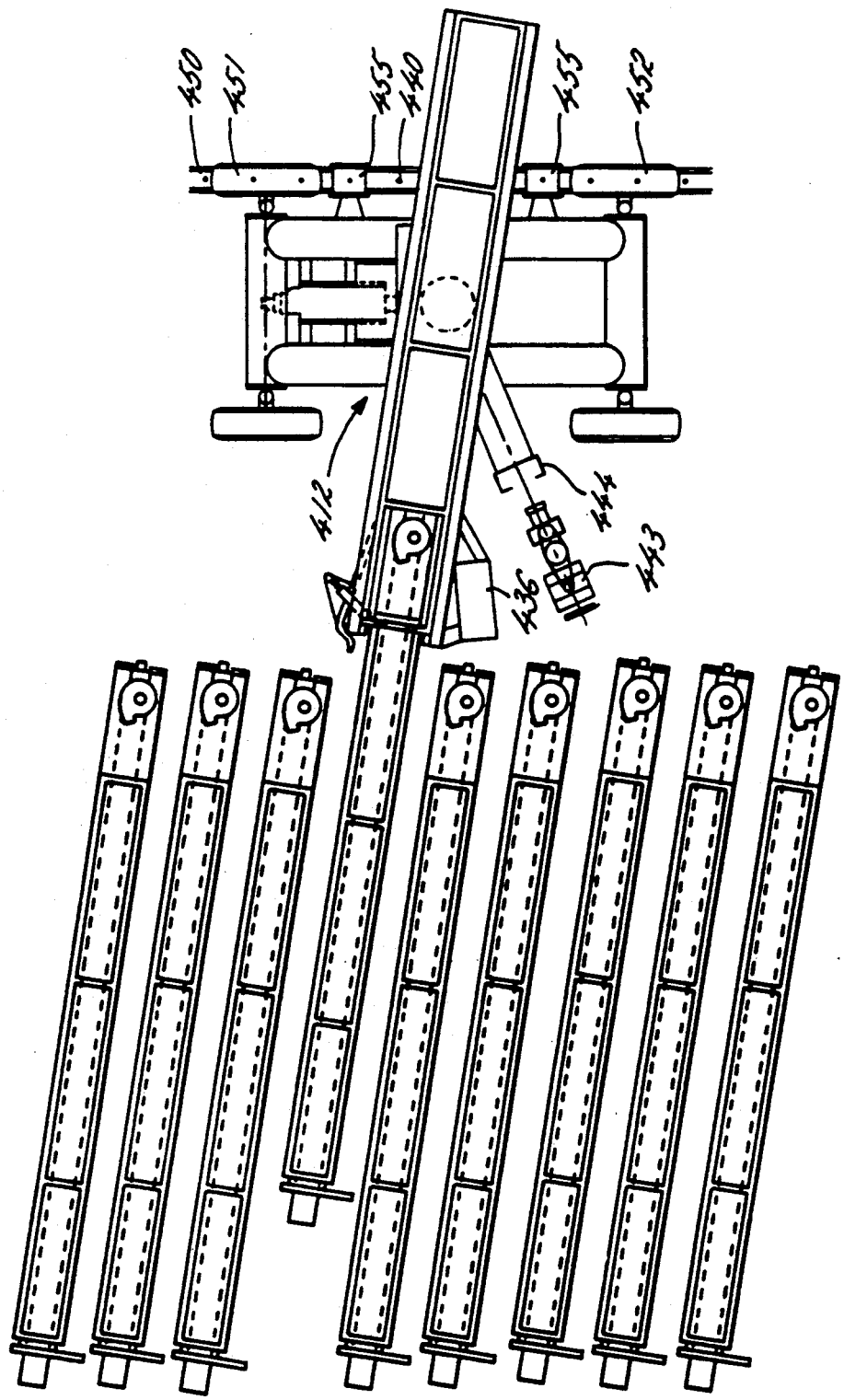
Figure 50:
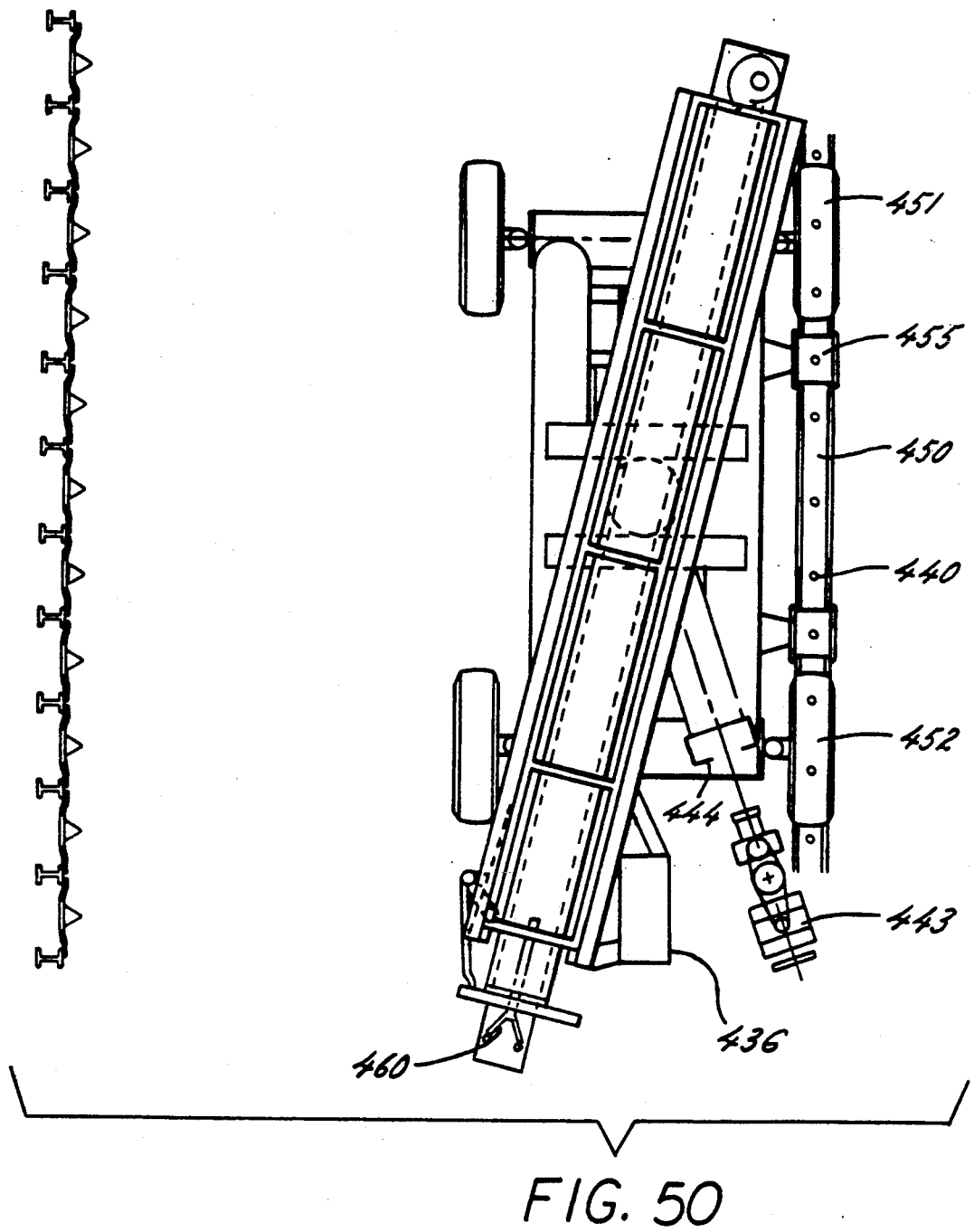
Figure 51:
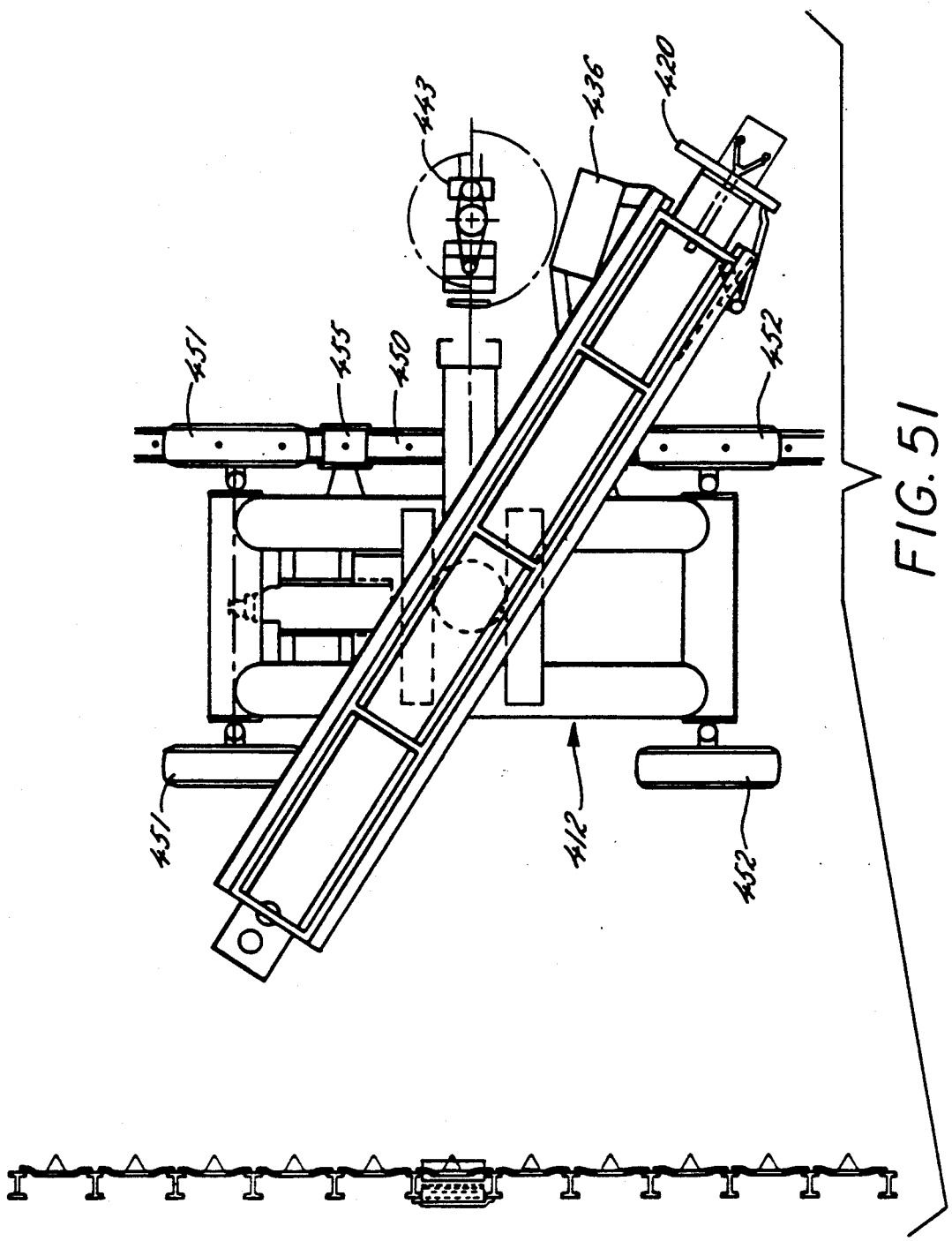
Figure 52:
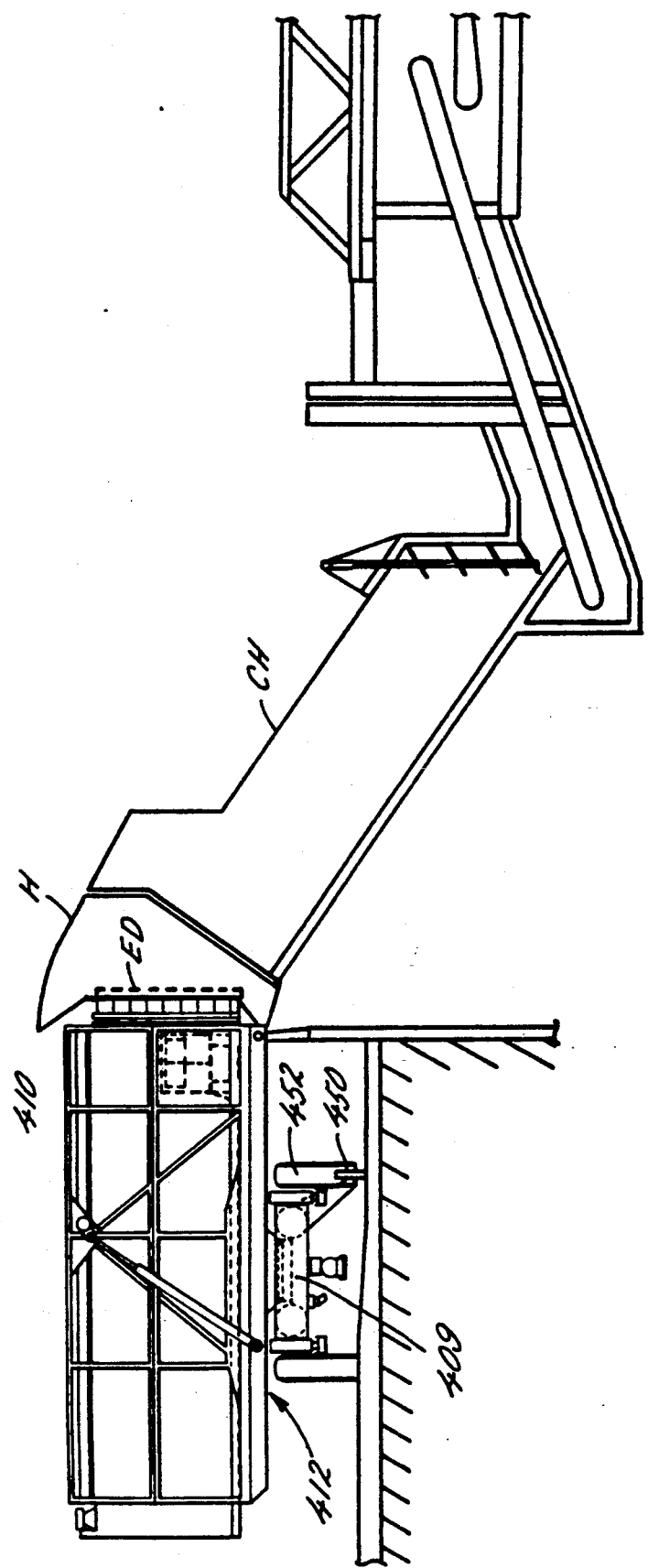
Figure 53:
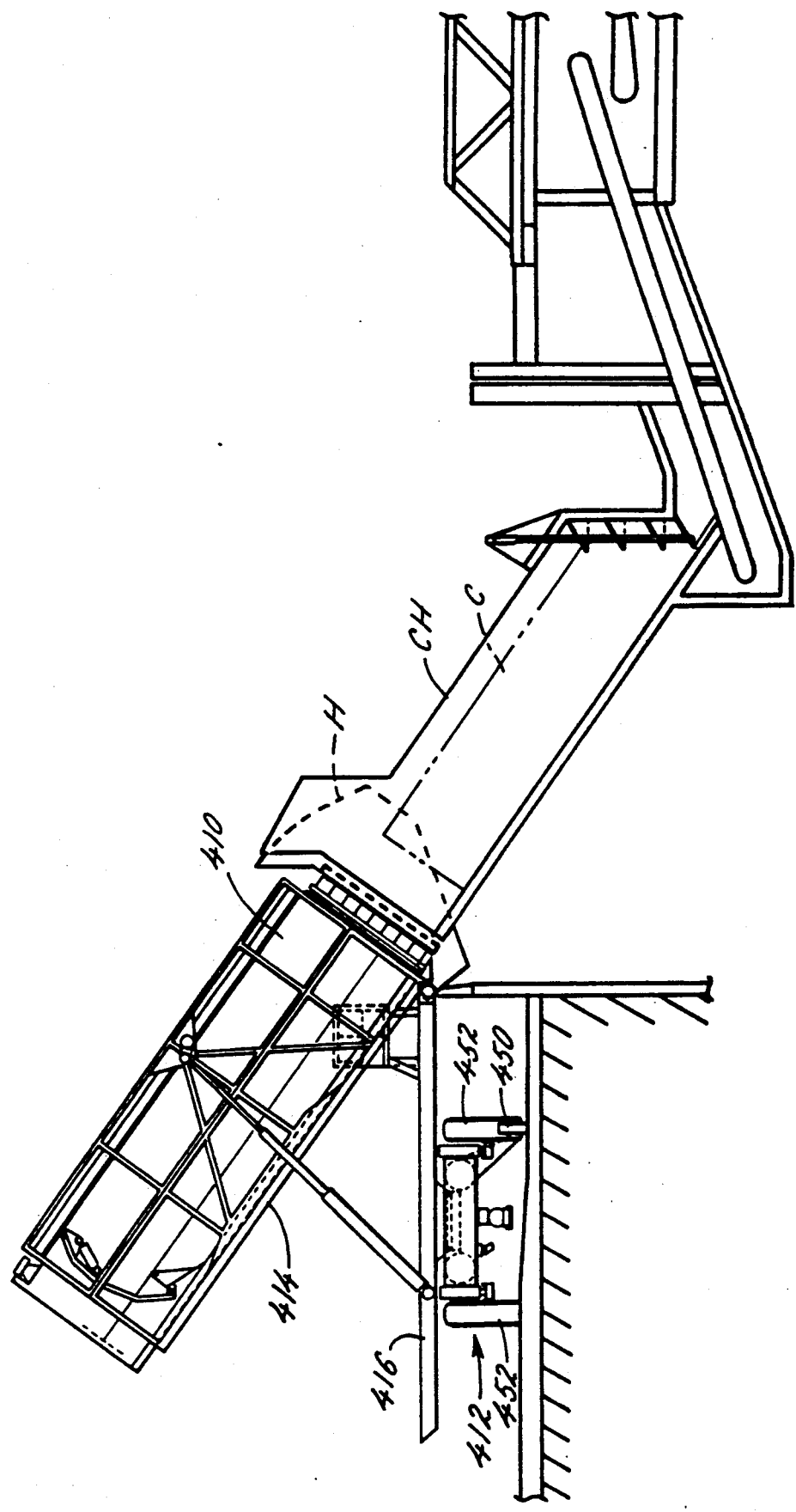
Figure 54:
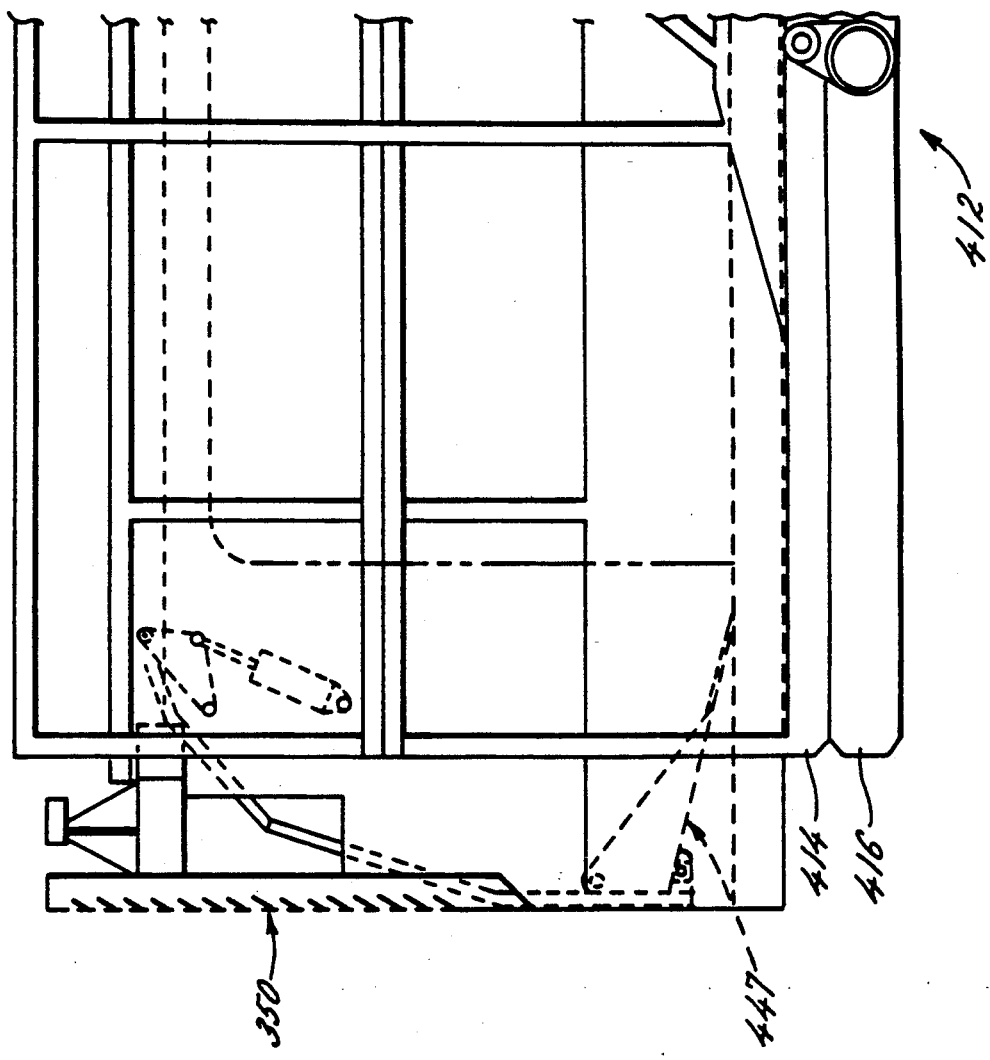
Figure 59:
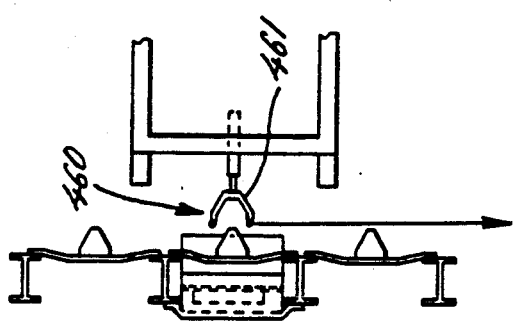
Figure 56:
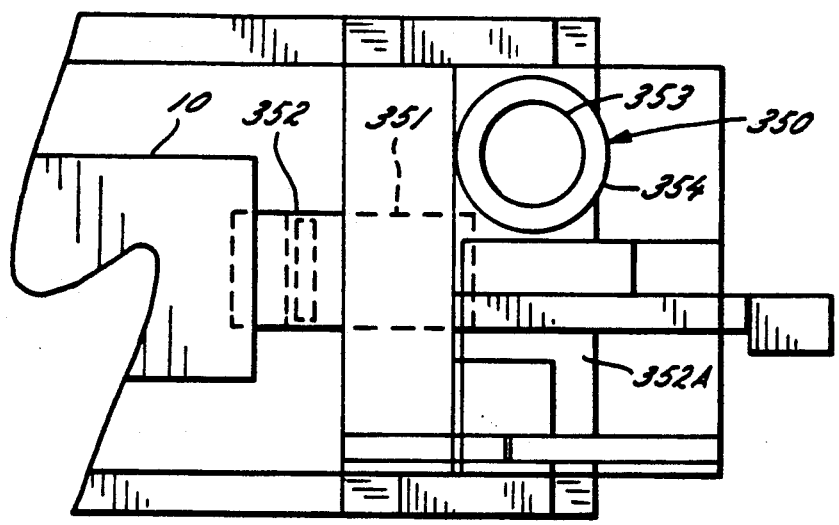
Figure 55:
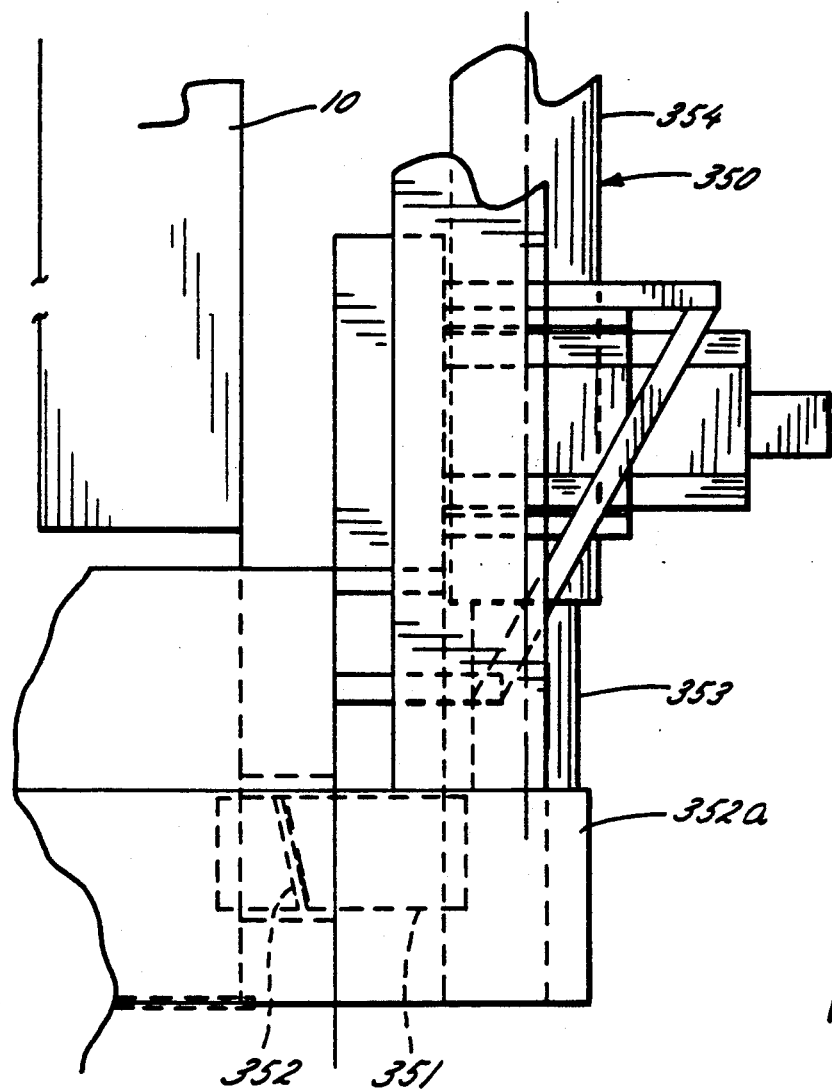
Figure 58:
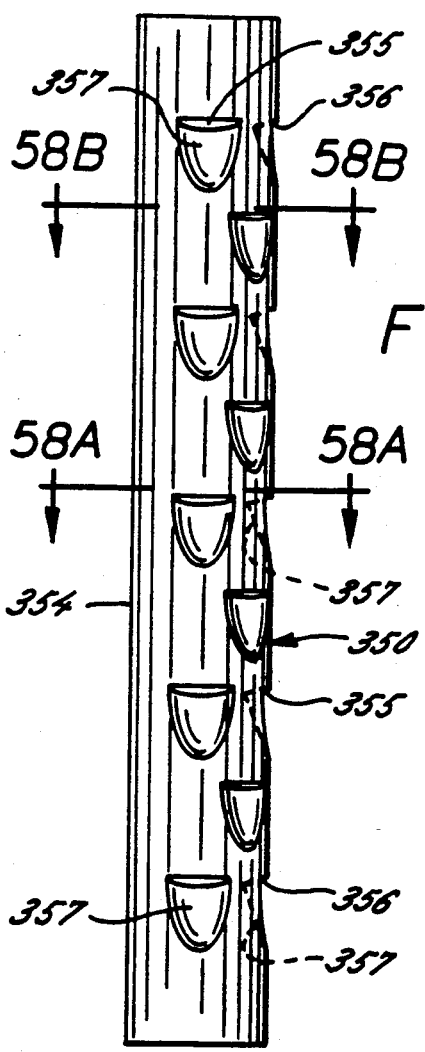
Figure 58B:
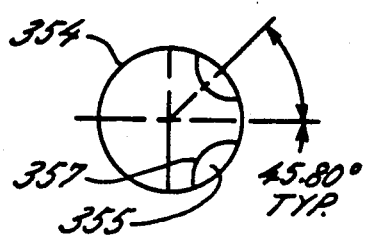
Figure 58A:
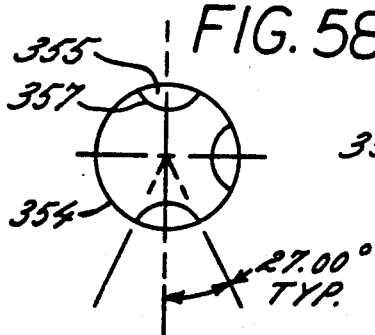
Figure 57:
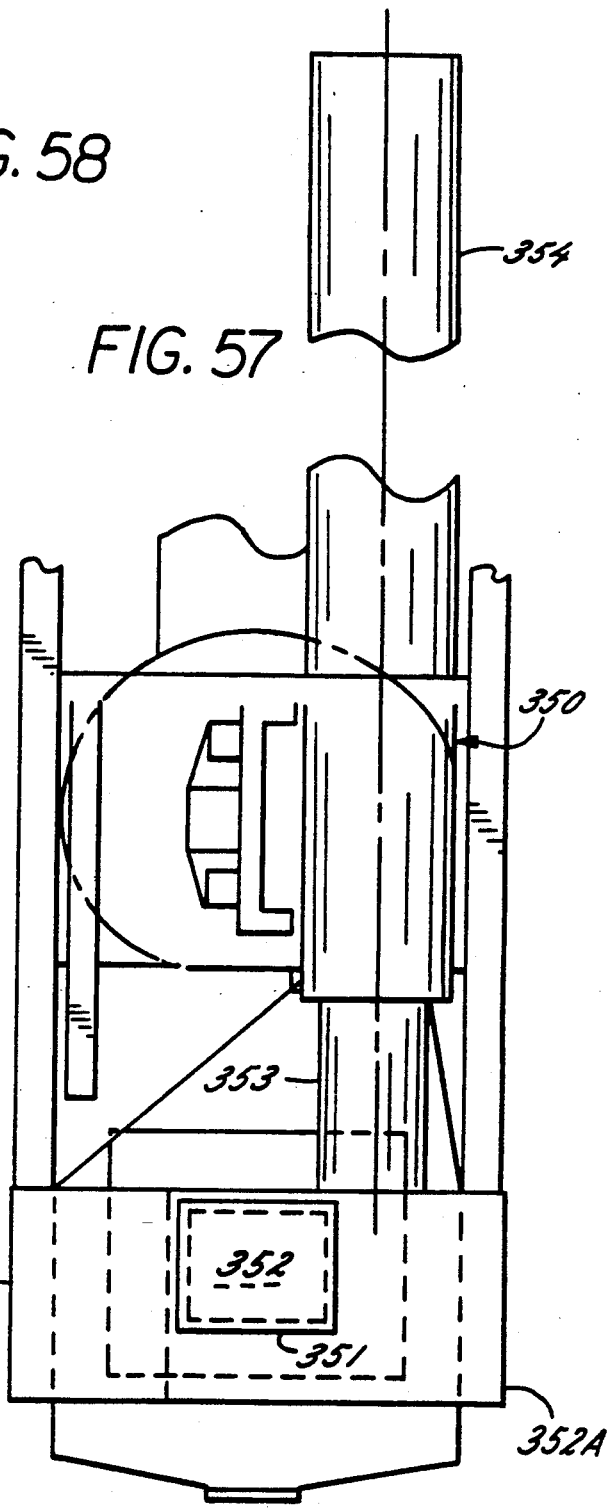

43(a) traveling to an oven;
(b) taking a push at an oven;
44(a) traveling to a cooling rack;
(b) at the cooling rack;
45(a) traveling to a receiving station; and
(b) at the receiving station;

FIG. 46 is a somewhat enlarged schematic plan view showing the modified coke box carrier traveling to an oven prior to taking a push;

FIGS. 47a-d are a sequence of somewhat enlarged schematic plan views showing the modified coke box carrier positioned at one of the coke ovens and further illustrating:

(a) the carrier aligned for oven door removal with the coke box door closed;
(b) the coke box aligned at the oven and the coke box door closed;
(c) the coke box aligned at the oven, the coke box door open and taking a push of coke;
(d) the coke box rotated away from the oven, the coke box door closed and the apparatus cleaning the oven jamb;

FIG. 48 is a schematic plan view of the modified coke box carrier traveling to a cooling rack;

FIG. 49 is a plan view of the modified coke box carrier aligned at a cooling rack;

FIG. 50 is a plan view of the modified coke box carrier traveling to a receiving station;

FIG. 51 is a plan view of the modified coke box carrier aligned at a receiving station;

FIG. 52 is a side elevation view of the modified coke box carrier positioned at the receiving station;

FIG. 53 is a side elevational view illustrating the coke box carrier elevated and being dumped at the receiving station;

FIG. 54 is a fragmentary side elevation of a coke box and carrier modified to incorporate a combustible gas burner tube;

FIG. 55 is a further enlarged fragmentary side elevation similar, but a reverse-hand view, to FIG. 54 showing the interconnection of the burner tube to the coke box;

FIG. 56 is a top plan view of the burner tube mounting of FIG. 55;

FIG. 57 is a rear elevation, with portions broken out, of the burner tube mounting of FIG. 55;

FIG. 58 is a side elevation of the burner tube itself;

FIGS. 58a and 58b are cross-sections taken substantially along lines A—A and B—B, respectively in FIG. 58; and FIG. 59 is a fragmentary plan view of a modified locating device for accurately centering the coke box with respect to the oven opening.

While the invention is susceptible to various modifications and alternative constructions, certain illustrative embodiments have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

DETAILED DESCRIPTION OF THE INVENTION

The present invention relates to improvements in the coke box itself and the apparatus for manipulating it to receive, cool, transport and discharge the coke. It is contemplated the the apparatus for manipulating the coke box operate either on tracks along the discharge end of a coke oven battery or as a wheeled, trackless vehicle. One preferred embodiment discussed below and illustrated in FIGS. 1–42 of the drawings is a wheeled, trackless vehicle.

Turning to the drawings, there is shown in FIGS. 1 and 2 a plan view and a side elevational view, respectively, of a preferred embodiment of the invention comprising a coke box 10 and carrier vehicle 12 which are employed together to receive a charge of coke in the form of a cake C from the coke oven O. A conventional ram R, shown in phantom in FIG. 2, is employed to push the coke from the oven O and into the coke box 10.

The carrier vehicle 12 includes an upper tilt frame 14 pivotally connected to the lower main frame 16 by a pivot shaft 18 located at the forward end of the carrier vehicle 12. The carrier vehicle 12 is designed to accommodate the limited maneuvering space available in many coking facilities. To this end, the main frame 16 is supported by a rear prime mover 20 and front wheels 22. A steering actuator 24 interconnects the main frame 16 and the prime mover 20 for pivoting the prime mover 20 relative to the main frame 16 about the vertical axis 26 that passes close to the axis of the prime mover ground wheels 28 so that the prim mover 20 can be turned substantially at right angles to the main frame 16 as shown in phantom in FIG. 1. This arrangement gives the vehicle 12 extremely good maneuverability by allowing the main frame 16 to turn substantially within its own length. The forward wheels 22 are also steerable. The wheels 22 are connected together via a tie rod 30 which is controlled by a steering actuator 32 as shown in FIG. 5. Struts 34 connect the wheels 22 and tie rod 30 to the main frame 16 and serve as pivot points during turning. This arrangement permits "crab-type" steering, which greatly enhances maneuverability.

At the end of the coking operation for a particular oven, the carrier vehicle 12 with the coke box 10 in place is driven into position so that the coke box 10 is substantially aligned with the coke oven O. As illustrated in FIG. 5, the position of the cab 36 provides an excellent view for the operator to align the coke box 10 with the coke oven O. Sights and alignment aids, discussed in more detail below, may be employed to aid in accurately aligning the coke box with the coke oven.

Figure 21:
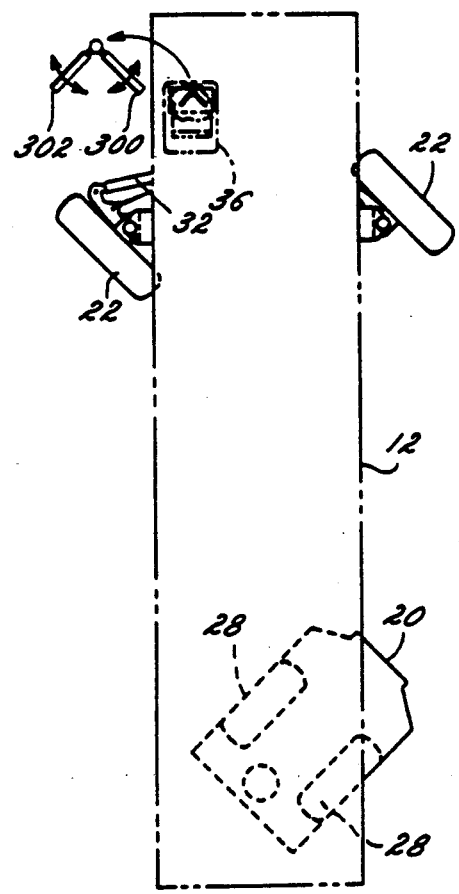
FIG. 21 is a schematic depiction of a tiller bar steering arrangement.
Figure 20:
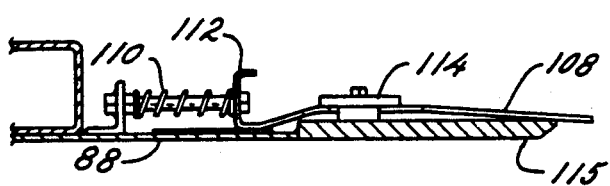
FIG. 20 is an enlarged, fragmentary sectional view of a seal plate retainer of the oven seal assembly taken through the plane 20—20 in FIG. 19.

The accurate alignment of the coke box with the coke oven is important in minimizing the force required to push the coke from the oven into the coke box. Specifically, the alignment must be accurate within a couple centimeters. In view of the fact that a vehicle of the type illustrated can be on the order of 20 meters long, 8 meters wide and 10 or more meters high, alignment to such an accurate degree in a short period of time can be a formidable task. As noted above, the vehicle is highly maneuverable in view of its all-wheel steering capabilities. It has been found that separate tiller-bar steering controls with each indicating the instantaneous direction of the respective sets of wheels, enhances the ability of the operator to quickly recognize and effect an appropriate steering adjustment. Such a system is depicted in FIG. 21. It should be noted in that figure that the tiller-bar 300 for controlling the forward wheels 22 is oriented the same as the wheels themselves, while the tiller-bar 302 for controlling the rear wheels 28 is independently oriented the same as those wheels.

Figure 41:
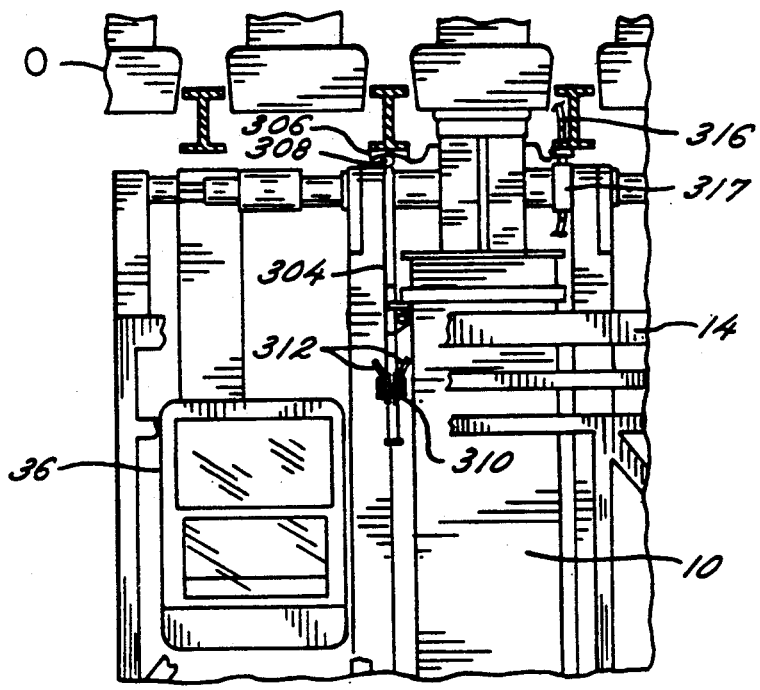
FIG. 41 is a fragmentary plan view of an apparatus to assist in aligning the coke box with the coke oven.
Figure 42:
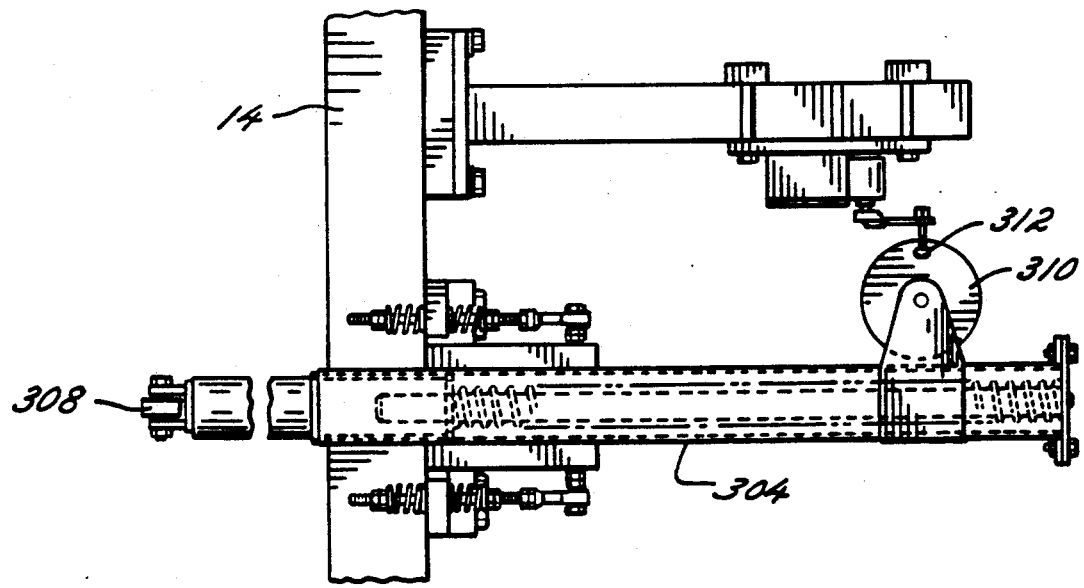
FIG. 42 is an elevational view of the aligning apparatus of FIG. 41.

A further alignment aid is shown in FIGS. 41 and 42. The aid consists of a forwardly-extending horizontally-pivotable probe 304 which interacts with a receptacle 306 at the coke oven to indicate the existence and extent of any lateral misalignment. The probe is telescoping so that, as the vehicle moves closer to the coke oven face, the probe is progressively compressed.

In the embodiment shown the receptacle 306 on the face of the coke oven O is fabricated to be V-shaped, and the probe has a roller 308 mounted on a vertical axis. In the event the probe 304 contacts the receptacle 306 off center, the probe will center itself by pivoting about the axis. This pivoting is sufficient to cause one of elements 310 on the rear of the probe to contact one of the microswitches 312. These microswitches in turn operate the side shifting cylinders 52 to shift the tilt frame (and the coke box therein) in the direction necessary to return the probe to a centered orientation. In this manner, the necessary side-shifting can be automatically accomplished during the final approach without the need for independent input from the operator.

In addition, the coke box may be provided with one or more contact-activated switches 314 which indicate when the coke box is in the correct orientation relative to the oven opening. It will be appreciated that four such switches, one near each corner of the open end of the coke box, can be employed to provide an indication of correct alignment, as by illuminating an indicator light when each switch is made.

Other alignment aids, such as sights, mirrors, light beams, and gyroscopes may also be employed to facilitate the final alignment of the coke box with the coke oven.

The coke handling system of the present invention may also be equipped with an alignment interlock to provide a signal confirming that alignment has been achieved and is being maintained. Such an interlock may be of a known type which completes a pneumatic circuit during alignment. Referring to FIG. 42, a pneumatic port 316 may be provided in the coke oven face over which a mating pneumatic port 317 carried by the vehicle can be applied when alignment is achieved. Once the mating is achieved, pneumatic pressure can in turn be employed to signal the operator of the ram at the other end of the furnace that pushing may commence. Conversely, should the pneumatic interlock circuit be broken at any time during the push, the signal will be lost and advance of the ram may be halted or otherwise adjusted as appropriate.

An optional system for clamping and aligning the carrier vehicle 12 and the coke box 10 with a conventional coke oven O having a coke bench B is illustrated in FIGS. 8 and 9. Such a clamping system may be used to supplement the vehicle wheel brakes (not shown) to prevent the carrier vehicle 12 from inadvertently being pushed away from the oven O during the pushing operation when the ram R pushes the coke cake C into the coke box 10. Thus, to prevent sliding, the clamping system secures the forward end of the main frame 16 to the coke bench B located at the base of the oven O.

In order to secure the main frame 16 to the coke bench B, the carrier vehicle 12 approaches the coke bench B and the main frame 16 is raised so that there is sufficient clearance between the main frame 16 and the coke bench B. The forward position of the main frame 16 is raised by a pair of pivotable, extendable struts 34 which also serve as the pivots for the front steering wheels 22 as shown in FIG. 1. The struts 34 may be of the type disclosed in U.S. Pat. No. 3,820,818 to Kress. The rear portion of the main frame 16 is similarly raised by a lifting actuator 38 associated with the rear prime mover 20. The lifting and steering operations may be controlled by the operator stationed in the cab 36 of the carrier vehicle 12. When the main frame 16 is resting on the coke bench B, the weight of the vehicle 12, coke box 10, and ultimately the coke C is shared between the coke bench B and the carrier vehicle 12.

Once the main frame 16 is resting on the coke bench B, the clamping system can secure the vehicle 12 to the outboard guide rail G. The clamping system, illustrated in FIGS. 7 and 9, comprises a frame clamping bar rigidly connected to the bottom of the main frame 16 and a pinching actuator 42 pivotally connected to the main frame 16. The actuator 42 controls a pinching lever 44 shown in phantom in the open position in FIG. 9. The pinching lever 44 is pivotally connected to the actuator 42 by a pin 46 and to the main frame 16 by a pin 48. Thus, the actuator 42 can pivot the pinching lever 44 about pin 48 to open and close the clamping assembly. The pinching actuator 42 grabs the coke bench guide rail G between the pinching lever 44 and the frame clamping bar 40, securing the carrier vehicle 12 to the coke bench B. When the main frame 16 is secured to the coke bench B, the carrier vehicle 12 cannot inadvertently slide away when the coke box 10 accepts a charge of coke C from the coke oven O.

Additionally, this arrangement maintains the coke box 10 in a relatively aligned position with the coke oven O.

The coke box 10 is carried on the vehicle 12 within the tilt frame 14. The tilt frame 14 has an inner portion 50 to position the coke box 10 within the vehicle 12 and to guide the coke box 10 on and off the vehicle 12 (discussed below). The entire tilt frame 14 is slidably mounted on the pivot shaft 18 for lateral movement relative to the main frame 16 such that the alignment between the coke box 10 and coke oven O can be "fined tuned" using a front and rear pair of side-shifting actuators 52, illustrated in FIGS. 7 and 8. The actuators are rigidly mounted on either side of the main frame 16 to slide the tilt frame 14 along the pivot shaft 18.

In order to permit the coke box 10 to be readily rolled back and forth along the inner frame 50, as well as to be rolled onto and from the vehicle, the coke box 10 is carried by a driveable roller 54 and a plurality of idler rollers 56 on the inner frame 50 as shown in FIGS. 7, 8, 10, 13, 14, 22 and 23. It is contemplated that, during the maneuvering of the vehicle 12, the coke box 10 be in the retracted position shown in phantom in FIGS. 1 and 2. As a result of the roller arrangement, however, the coke box 10 can roll forward relative to the tilt frame 14 to engage the coke oven O and permit a ram R to push the coke C into the coke box 10. In the embodiment shown, as best seen in FIG. 31, the idler rollers 56 are rotatably mounted on the tilt frame 14 substantially in the center of the inner frame 50. The idler rollers 56 have a central flat 58 flanked by flanges 60 to mate with and guide rail 62 mounted to the bottom of the coke box 10, thus assuring proper alignment and added stability of the coke box 10. To restrain the coke box 10 against horizontal movement, a plurality of upper guide rollers 64 mounted to the top of the inner frame 50, illustrated in FIG. 22, are rotatably attached to the upper portion of the coke box 10 such that they engage horizontal rails 66 to maintain the coke box 10 in a vertical orientation.

Figure 13:
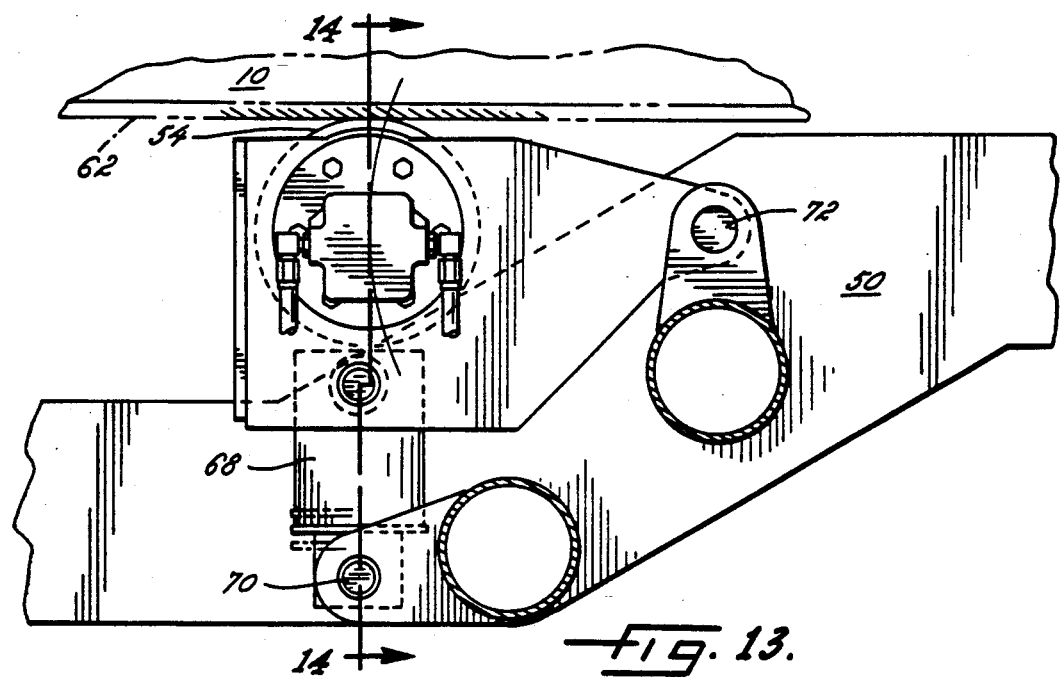
FIG. 13 is an enlarged, fragmentary sectional view of the coke box roller assembly taken through the plane 13—13 in FIG. 7.
Figure 14:
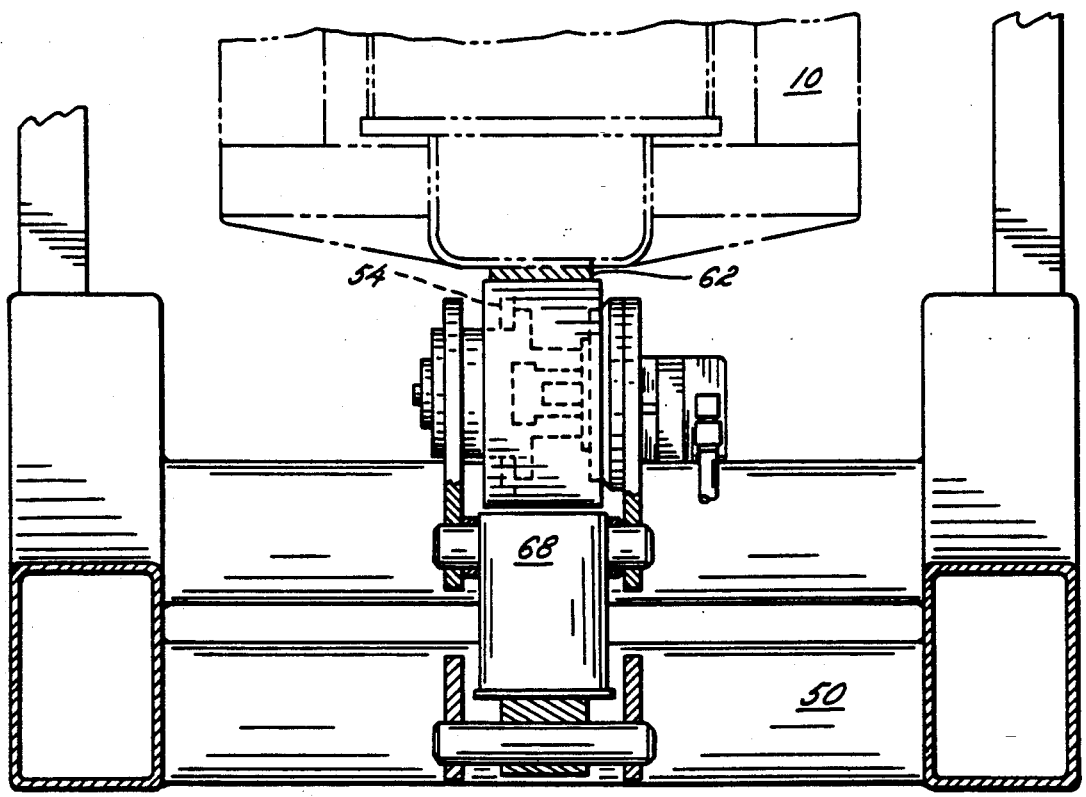
FIG. 14 is an enlarged, fragmentary sectional view of a coke box roller assembly taken through the plane 14—14 in FIG. 13.

One mechanism for powering the coke box 10 along the inner frame 50 and on and off the vehicle 12 is the power driven roller 54 shown in FIGS. 7, 13 and 14. A hydraulic cylinder 68, pivotally mounted to the tilt frame 14 by a pin 70, raises and lowers the power driven roller 54, also pivotally mounted to the tilt frame 14 by a pin 72, to engage and disengage the rail 62 projecting from the bottom of the coke box 10 as needed. When the power driven roller 54 engages the rail 62, the roller 54 can position the coke box 10 along the inner frame 50 to load and unload the coke box 10 from the carrier vehicle 12, and to engage and disengage the coke box 10 from the coke oven O.

It will be appreciated that the coke box 10 must be secured to the tilt frame 14 during loading to prevent the action of the ram R and the coke cake C from causing the coke box 10 to slide along the inner frame 50. Similarly, the coke box 10 must be secured while unloading the cooled coke C into a sizing station so that the coke box 10 will not roll off the raised tilt frame 14.

The mechanism for securing the coke box 10 to the tilt frame 14, as well as a second mechanism for shifting the coke box 10 relative to the tilt frame 14 is shown in FIGS. 10 through 12. The mechanism comprises a pair of telescoping cylinders 74 pivotally mounted by a pin 76 on either side of the inner frame 50 and a pair of actuating cylinders 78 located such that actuating cylinders 78 can pivot the cylinder 74 to engage and disengage a pair of trunnion pins 80 projecting from either side of the coke box 10. One end of the cylinder 74 has a ramp 82 with a hole 84 to positively lock the trunnion pin 80, as illustrated in phantom in FIG. 10, thus securing the coke box 10. The ramp 82 may telescope in and out to position the coke box 10 along the inner frame 50 as desired.

Once the main frame 14 is securely clamped to the coke bench B, and the coke box 10 is accurately aligned with the coke oven O, either the cylinders 74 or the power driven roller 54 may be employed to advance the coke box 10 to engage the coke oven O to receive a charge of coke C.

As disclosed in U.S. Pat. No. 4,285,772 referred to above, and as illustrated best in FIGS. 3, 4, 22 and 23, the coke box 10 is rectangular in the shape of a parallelepiped and has a volume slightly greater than that of the coke charge C to be received. Thus, the coke cake C may be pushed by a ram R from the coke oven O into the coke box 10 without significantly changing the shape of the coke cake C. With such an arrangement, the pulverization which would otherwise occur when the coke C is pushed into a conventional hopper car is minimized. An additional advantage of this arrangement is that the large surface area of the thin, rectangular coke box 10 is conducive to efficient cooling, either through the coke box 10 surfaces or via an internally circulated inert gas, discussed below. As best illustrated in FIG. 2, the coke box 10 may be made somewhat longer than the initial length of the coke charge C in order to accommodate any crumbling of the leading edge of the coke charge C as it is pushed into the box 10.

As also disclosed in U.S. Pat. No. 4,285,772, it is desirable for the coke box 10 to be substantially air-tight to prevent ignition of the hot coke C. Moreover, an oven seal arrangement, shown in FIGS. 15 and 19 through 21 and discussed in more detail below, is provided to create a substantially sealed relationship between the coke box 10 and the coke oven O during the pushing operation. Thus, during the pushing operation and thereafter, ignition of the hot coke C from the coke oven O is prevented. The air-tight coke box 10 also prevents substantially all the particulate matter from escaping to cause air pollution.

According to an aspect of the present invention, provision is made to allow the sides of the coke box 10 to expand and contract during the wide thermal swings which the coke box 10 experiences. In the embodiment shown, the coke box 10 comprises a receiving chamber 86 made of relatively thin metal panels 88. External support posts 90, spaced from the sides and bottom of the receiving chamber 86, provide the necessary support for the panels 88 without rigid or permanent interconnection therewith. A plurality of support posts 90 shown in FIGS. 3 and 4, are placed along the length of the coke box 10. A plurality of connecting members 92 placed on the posts 90 support the receiving chamber panels 88.

The opposite ends of each connecting member 92, shown best in FIGS. 27 and 28, are fixed to the panel 88 with the connecting member 92 surrounding the associated support post 90 to provide the necessary support for the panels 88 without rigid or permanent interconnection with the support post 90. A T-bar 94 is shown rigidly connected to the post 90 and extending substantially the entire length of the support post 90 and panels 88. A spring 96 is shown disposed between the interior of the connecting member 92 and the exterior of the support post 90 to permit the restrained flexing of the receiving chamber panels 88. Each spring 96 is maintained in position with a boss 98 shown fixed to the band 92. In the event that it is desired to limit or prevent the movement of the panels 88 relative to the posts 90, the bosses 98 may be replaced with bolts 97 to selectively overcome the force of the springs 96. It will be appreciated that the T-bars 94 serve as stand-offs to provide support for the chamber panels 88 with minimal contact area. The outside radius of the T-bar 94 resting on the panel 88 permits meniscus wetting around the contact point 99 between the T-bar 94 and the panels 88. This arrangement permits the substantially unrestricted circulation of the cooling medium discussed in more detail below.

According to another aspect of the invention, in order to compensate for pressure changes within the receiving chamber 86, relief pressure vents 100 are provided at each end of the coke box 10. A baffle swing plate 102, disposed within the receiving chamber 86 and between the rear pressure vent 100 and the coke C as shown in FIGS. 2 and 35, maintains a clear path 104 for any gasses to escape.

Turning to FIGS. 29 and 30, an embodiment of pressure vents 100 is illustrated which includes caps 101 which rest in sand S and over open tubes 103A welded into the top of receiving chamber 86. The sand S contained in a sand reservoir 105 centered with respect to the tubes, as shown in FIG. 29, has an angle of repose of about 35° which is substantially the angle of the tilt frame 14 undergoes during unloading of the coke C. The cap 101 is spaced above and centered with respect to the tubes 103A via a series of centering studs 107 rigidly attached to the exterior of the tubes 103A. The cap 101 rests on the studs 107 to create a space between the top of the tube 103A and the cap 101. The sand seal permits the gasses within the receiving chamber 86 to escape while preventing the outside atmosphere from entering and igniting the hot coke C. It will be appreciated that particulate emission is minimized by passing the gasses through the sand S prior to releasing the gas to the atmosphere. Vacuum relief is also provided in the event the pressure drops below atmospheric. As shown in FIGS. 29 and 30, plate 109 is free to move downwardly against the force of spring 111, allowing air to enter through plate openings 113.

Figure 19:
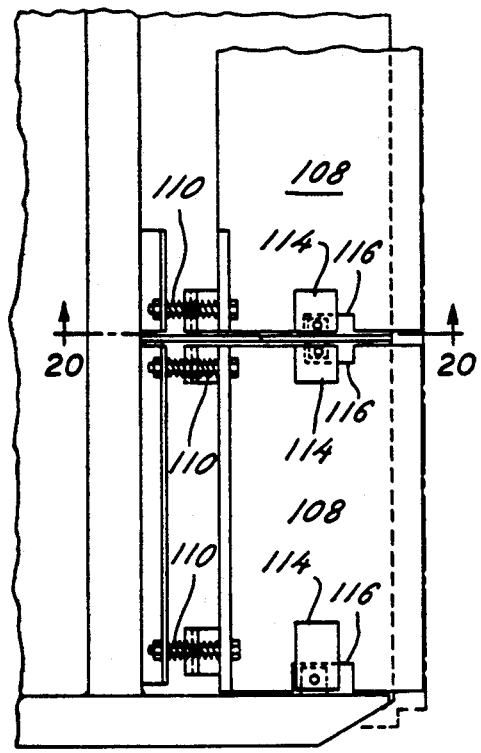
FIG. 19 is an enlarged, fragmentary elevational view of an oven seal assembly taken through the plane 19—19 in FIG. 15.

Once the carrier is in place at the coke oven, the main frame 16 is optionally secured to the coke bench guide rail G, and the coke box 10 door is accurately aligned with the coke oven O, either the cylinders 74 or the power driven roller 54 may be used to advance the coke box 10 to engage the coke oven face F as shown in FIG. 15. Referring jointly to FIGS. 15 and 19, the coke box 10 is advanced until a pair of stop bars 106 located on either side of the coke box 10 contact the coke oven buckstays BS and oven seal plates 108 are urged into engagement with the oven face F by springs 110. A container funnel section 115 attached to the panels 88 substantially surrounds the opening at the coke box 10. The oven seal plates 108 also substantially surround the coke box 10 but without being rigidly attached to the coke box 10. Additionally, the oven seal plates 108 extend past the coke box 10 and funnel section 115 to engage the oven face F to create a relatively tight seal around the circumference of the coke box 10. The ends of the springs 110 butt against a perpendicular lip 112 at the rear of the oven seal plates 108. Seal plate retainers 114, are connected to the coke box 10 through notches 116 in the seal plates 108. The notches are sized to permit the required movement of the seal plates. It will be appreciated that this arrangement permits the seal plates 108 to seal against the coke oven face F by compensating for minor side-to-side or top-to-bottom misalignment of the coke box 10 relative to the coke oven O. In addition, slits (not shown) may be provided in the funnel section 115 to minimize any bowing which might otherwise occur from thermal gradients.

Once the coke box 10 is sealed to the coke oven O, the coke box door plate 120, shown in the closed position in FIG. 6, may be shifted to the open position (shown in phantom in FIG. 6) to permit the coke box 10 to be loaded with a coke charge C. As shown in FIG. 6 and FIGS. 15 through 18, the door plate 120 has an opening 124 conforming substantially to the opening 126 of the coke box 10 and two horizontal slots 128 located at the top of the door plate 120. The door plate 120 is slidably disposed within a slot 122 in the forward portion of the coke box 10 so that when preparing to load a coke charge C into the coke box 10, a door shifting frame 130 slides the door plate 120 so that the plate opening 124 substantially aligns with the coke box opening 126 as shown in phantom in FIGS. 6 and 16. Once the plate opening 124 is aligned with the coke box opening 126, the ram R may pushed the coke cake C from the oven O into the coke box 10.

Upon the opening of the coke box door, the radiation from the flowing coke will heat the air in the coke box, causing it to expand. In addition as the coke enters, gas is displaced. It has been found that this expansion and displacement can result in a relatively high velocity countercurrent flow of gas past the entering coke. This gas which can contain pollutants can re-enter the furnace area and exit the furnace vents and/or ascension tubes. It can also create an undesirable "blow-torch"-like flame around the coke box/oven face seal. This phenomenon can be avoided by exhausting the air from the coke box at a rate substantially equal to the rate at which the air expands and is displaced. In the embodiment shown, this is accomplished through the use of a blower 318 mounted on the rear face of the coke box which expels air from the coke box. In the event it is considered necessary or desirable to scrub any particulates from the expelled air, this can be accomplished by ducting the expelled gas from the box into a water reservoir. A convenient reservoir would be the reservoir 158 which covers the bottom of the box. In FIGS. 4 and 35, duct 320 is shown connecting the outlet of the blower to the reservoir 158. By controlling the rate of removing gas from the box no significant pollutants will enter the water, and none will be discharged to the atmosphere.

In accordance with another aspect of the present invention, it is contemplated that the combustible gases emanating from the coke cake C when it is pushed into the coke box 10 may be discharged from the coke box, combined with oxygen in the air and burned in an appropriate burner mechanism. Turning now to FIG. 54, it will be seen that the coke box 10 includes a gas burn-off tube, illustrated schematically at 350. Pursuant to this aspect of the invention, as the hot coke cake C is pushed into the coke box 10, the combustible gases emanating from the coke cake C are emitted into the free space within the coke box and as the cake is further urged into the empty box the gases are forced towards the rear. Even after the coke cake is pushed entirely into the box 10, the hot coke continues to emit combustible gases for sometime thereafter. These combustible gases are comprised primarily of hydrogen and carbon monoxide but may also include small percentages of methane, ethane and propane. Some carbon dioxide, nitrogen and free oxygen may also be present a well as a small percentage of sulfur.

In order to safely discharge the hot combustible gases from the coke box, provision is made for a trap door in the lower rear of the coke box to open and exit the combustible gases into a burner chamber. In the burner chamber the hot gases are ignited through suitable means such as an electronic igniter and a propane pilot tube (not shown) and the hot gases and the products of combustion exit through a burn-off tube illustrated here as 350.

Initially the concentration of hydrogen and carbon monoxide are sufficiently high that once the burner flame is ignited the combustible gases are self-sustaining for some period of time after the hot coke has been pushed into the box and for a substantial period thereafter. In practice this period may last anywhere from ten to fifteen minutes, upwards to an hour and a half. During this time, of course, the combustible gas is cooled as the coke cake itself begins to cool and also the concentration of both hydrogen and carbon monoxide decrease rapidly. Within a period of time within the range specified above, the combustible gases can no longer sustain a flame and the burner self-extinguishes. Should the concentration increase, the flame can be re-ignited but ultimately the concentration drops to a negligible level.

Turning now to FIGS. 55-58, further details of a preferred embodiment of the gas burn-off mechanism 350 are illustrated. As shown in FIG. 55, the lower rear portion of the coke box 10 is provided with a horizontal duct 351 communicating from the interior of the coke box to the outside. Within the duct 351 is a flapper valve 352 which automatically opens as the hot combustible gases begin to accumulate and expand. The duct 351 communicates with the interior of a substantially rectangular plenum chamber 352a having a vertically disposed discharge duct 353. The duct 353 extends upwardly within an elongated vertical venturi tube 354 which, as shown in FIG. 58, is formed with a plurality of air entrance openings 355. Each of the air entrance openings 355 is struck from the sidewall of the venturi tube 354 and is formed by making a horizontal cut 356 through the tube and by a flap portion 357 being pushed inwardly into a D-shaped configuration as shown in FIG. 58. This provides a reduced cross-section in the venturi tube 354 as may be seen in greater detail in FIGS. 58a and 58b. In other words, each of the depressed flap portions 357 constricts the inner diameter of the tube 354 reducing its cross section and accelerating the flow of gas as it passes upwardly in the tube. This enhances the velocity of the gas, the turbulence within the flue tube and creates a more complete combustion of the gases exiting therethrough.

After the coke box 10 is loaded, the shifting frame 130 slides into the door plate 120 to the closed position shown in FIGS. 6 and 16. An additional advantage is that the door plate 120, shown in phantom in FIG. 5, protects and shields the operator in the cab 36 from the heat released from the open coke oven O.

The door shifting frame 130 engages the door plate 120 on each vertical side so that the door plate 120 slides with the shifting frame 130. To maintain the alignment between the coke box 10 and the door plate 120, upper guides 132 rigidly secured to the coke box 10, are projected into the two horizontal slots 128 located at the top of the door plate 120 as shown in FIG. 6. A pair of actuators 134, rigidly attached to the top and the bottom of the tilt frame 14, connect the tilt frame 14 with the door shifting frame 130 to control the movement of the door plate 120. Alignment between the door shifting frame 130 and the tilt frame 14 is maintained with a series of guide rollers 136 carried by the door shifting frame 130. The tilt frame 14 is interposed between the rollers 136 so that the shifting frame 130 may open and close the door plate 120, while maintaining alignment with the tilt frame 14.

To accommodate movement of the coke box 10 along the inner frame 50, the coke box 10 may be opened and closed in two positions. As may best be appreciated in FIG. 15, the door shifting frame 130 has a forward portion 130F which is shown engaging the door plate 120 and a rear portion 130R which may also engage the door plate 120 (not shown) if the coke box 10 were positioned further to the rear of the tilt frame 14.

In order to control the temperature of the door, the door plate 120 is hollow to permit water to be pumped through an upper water inlet 138 and cascade past a series of baffles 140, illustrated in FIGS. 17 and 18, until the water leaves through a lower water outlet 142. A hose, not shown, empties the water back into the lower water collection trough 158. In addition, water may be pumped through one or more of vertical channels 143 and 144 surrounding the door plate 120 to assist in conducting heat away from the door plate 120. Once the door is closed, it also may be clamped against the vertical channels 143 to more completely seal the coke in the box until the completion of the cooling, discussed below.

In accordance with an important aspect of the invention, a system to indirectly cool the hot coke C to below its kindling temperature is shown in FIGS. 22 and 23.

The initial cooling of the coke receiving chamber 86 begins while the coke box 10 is in position at the coke oven O trough a cooling water system. Later, the coke box 10 may be cooled either on the carrier vehicle or taken to a remote cooling station. The basic cooling system comprises a pump 146 to distribute water from a catch basin 148 in the main frame 14 or the cooling station to an upper trough 150 on the coke box 10 which cascades water along exterior of the receiving chamber 86 of the coke box 10.

Referring again to FIG. 1, a pump 146, located on the main frame 16, pumps water from a catch basin 148 through a standpipe 152, to an upper reservoir 154 centrally located at the top of the coke box 10. A plurality of weir tubes 156 best shown in FIG. 23 maintain the correct level within the reservoir 154 by conducting any water overflow to a lower collection trough 158 extending substantially around the bottom of the coke box 10. The water, pumped into the upper reservoir 154, distributed to an upper trough 150, extending substantially around the entire length of the coke box 10.

As illustrated in FIGS. 22 through 26, the upper trough 150 is formed by a top plate 160, side plates 162 surrounding the upper portion of the coke box 10, and a rigid bottom plate 164. Water enters the water trough 150 from the upper water reservoir 154 through a plurality of inlets 166. The bottom plate 164 is rigidly secured to the support posts 90 as best shown in FIG. 24. Rigidly connected to the bottom plate by a plurality of bolts 168 is a flexible arcuate-shaped plate 170, extending the entire length of the coke box 10, creating a dam with the receiving chamber panels 88. In the embodiment shown the dam plate 170 has a plurality of dimples 172 intermittently spaced along the dam plate 170 engaging, but not connecting, the receiving chamber panels 88 to create a very small water gap 174. The same result can be achieved by installing spacers, for example, segments of wire or rod of the desired diameter, between the dam plate and the surface of the panels 88. The water gap 174 permits the water from the upper trough 150 to cascade over the receiving chamber panels 88, thereby cooling the coke box 10. The dam plate 170 is made of a thin, resilient material preloaded against the panels 88 so that it can flex with the panels 88 to maintain a consistent water gap 174 regardless of the deflection of the panels 88.

The water cascades down the side of the chamber panels 88 thus indirectly cooling the hot coke. As shown in FIGS. 22 and 23, the water is collected in a relatively U-shaped lower collection trough 158 which surrounds the bottom of the coke box 10. Water from the lower trough 158 may be drained into the catch basin 148 in the main frame 16 through a pair of gate valves 176 located on either side of the coke box 10. The water level in the lower trough 158 is maintained by a system of wiers 178 located directly above the gate valves 176. As shown in FIG. 31, the wiers 178 have relatively small drain holes 180 which, during operation of the pump 146 have little effect, but which allow virtually complete draining of the reservoir 148 when the pump 146 is shut down.

As shown in FIGS. 31 through 34, each gate valve 176 comprises a slidably mounted valve plate 182 having an opening 184 conforming substantially to the valve opening 186 so that the water is drained from the lower collection trough 158 by aligning the plate opening 184 with the valve opening 186. A valve seal 188 which surrounds the valve opening 184 is shown in FIG. 34. A system, not shown, is provided to assure the gate valves 176 are open when the coke box 10 is in a predetermined orientation on the vehicle 12. Activators, not shown, may also be provided to selectively open the gate valves as when the coke box 10 is removed from the vehicle 12.

The coke box 10 may be cooled to a desired temperature directly on the carrier vehicle 12 or it may be taken to a cooling station (not shown) where it may be unloaded from the carrier vehicle 12 to finish the cooling process, permitting the carrier vehicle 12 to obtain an empty coke box 10 and return to the coke oven O to continue unloading the coke C. It is contemplated that the carrier vehicle 12 approaches a series of cooling racks to substantially align the coke box 10 with a cooling rack in a manner similar to the coke oven O. Once the coke box 10 is substantially aligned, the actuators 52 fine-tune the lateral alignment. The telescoping cylinders 74 or the power rollers 54 move the coke box 10 off the carrier vehicle into the cooling rack. The coke box 10 is then cooled by cascading water over the exterior of the coke box 10. Alternatively, or in addition, the coke C may be cooled using an inert gas cooling system such as is discussed below.

It is contemplated that the cooling station will comprise a plurality of cooling racks, each cooling rack able to hold a coke box 10 during the cooling process. The water distribution system is similar to the system contained in the carrier vehicle 12. Water is pumped from a catch basin 148 located at the bottom of the cooling racks to the upper water reservoir 154 of the coke box 10. In a manner similar to the cooling process discussed for the carrier vehicle 12, the water cascades over the exterior of the coke box 10, thus cooling the hot coke C.

It may be desirable to introduce mixing and movement of the atmosphere within the coke box to supplement any convection currents which might otherwise be established. Such circulation can be accomplished by employing, for example, the blower 318 which, as shown in FIG. 4, is attached to and communicates with the coke box 10. Alternatively, the atmosphere might be circulated using a circulation system of the general nature in FIGS. 36-40 shown and described below in the context of heat dissipation through circulation of inert gas. It is expected that such a blower or circulation system will increase the rate of heat transfer to and through the sidewalls of the coke box, as when using the water cascade system described above. Such a blower system can be coupled with a system of baffles discussed below in connection with the inert gas circulating system.

It may also be desirable to increase the gas circulation between the side walls of the coke box and the coke cake. One way to accomplish this is by forming horizontally extending corrugations in the side panels 88 of the coke box 10. Such corrugations are depicted in phantom as items 89 in FIG. 22. It is contemplated that the innermost surfaces 89a of the corrugations 89 provide lateral support for the coke cake, with the outer portions of the corrugations forming "ducts" 89b through which circulating gas can travel.

Once the coke C is cooled, a carrier vehicle 12 may take the cooled coke box 10 to an area for discharge, such as a coke sizing station where the coke cake C may be sized into the required pieces. It is contemplated that the carrier vehicle 12 approach the coke crushing station to substantially align the coke box 10 with the coke crushing station in a manner similar to the coke oven O and the cooling racks. Once the coke box 10 is substantially aligned, the inner frame actuators 52 find tune the lateral alignment. The telescoping cylinders 74 shift the coke box 10 along the inner frame 50 to the desired position and thereafter secure the coke box 10 to the tilt frame 14. A pair of tilt actuators 190, pivotally connecting the tilt frame 14 and the main frame 16 on either side of the carrier vehicle 12, raises the tilt frame 14 about the pivot shaft 18. FIG. 35 illustrates a carrier vehicle 12 in a tilted (dumping) position with the coke box 10 inclined at a sufficient angle to cause the coke cake C to slide out of the coke box 10. With such an arrangement the cooled coke may be smoothly discharged, without subjecting the coke C to an uncontrolled free fall which might pulverize it, and without releasing contaminants to the atmosphere. Alternatively, or in addition, removal of the coke may be aided by vibrating the box. Such vibration may be effected by mounting a vibrator 322 on one of the box surfaces as illustrated in FIG. 35.

Removal of any coke that might not freely slide out of the coke box when tipped may also be accomplished through the use of a scraper at the dump station. Such a scraper arrangement is illustrated in FIG. 35, where a scraper blade 324 is shown mounted to a beam 326. This beam slides through a guide 328 pivoted at point 330 in the dump chute to accommodate movement of the scraper up the inclined surface of the coke box 10. With the coke box in place and all coke removed except any which might stick and remain behind, the scraper blade can be moved into the box along the floor thereof to loosen any coke which has not previously fallen out.

In accordance with another aspect of the invention, provision may be made for an inert gas cooling system, such as the one depicted in FIGS. 36 through 40. Like the water cooling system, the inert gas cooling system may be carried directly on the carrier vehicle for immediate cooling or it may be stationed at a remote cooling station.

In the embodiment shown (FIGS. 36 and 37), the inert gas cooling system is attached to the tilt frame 14 so that the coke box 10 may roll along the inner frame 50 without interference. More specifically, a pair of sealing tube structures 200 are attached to the top of the tilt frame 14 so that the coke box 10 may pass underneath without interference. Similarly, a vortex separator 202 and a series of finned heat dissipation tubes 204 are attached to the top and side of the tilt frame 14, respectively, so as not to interfere with the movement of the coke box 10.

After the coke box 10 is loaded with hot coke C and the coke box 10 is secured within the tilt frame 14 as previously discussed, the sealing tube structures 200 shown may be positioned over a rear supply vent 206 and a front return vent 208, respectively. The sealing tube 200, shown in the raised position in FIG. 37, is positioned by an upper support arm 210 and a lower support arm 212 to drop into a sand reservoir 105, thus, sealing the rear supply vent 206 and front return vent 208 and creating a closed passage between the heat dissipation tubes 204 and the coke box 10. An actuator 214 pivotally connected to the top of the tilt frame 14 and to the upper support arm 210 controls the positioning of the sealing tube 200. Once a closed passage is created, a blower 216 attached to the tilt frame 14 between the rear supply vent 206 and the heat dissipation tubes 204, draws the cooling gas through a tubular supply duct 218 connecting the heat dissipation tubes 204 with the rear supply vent 206. To ensure that the cooling gas enters the coke box 10 and circulates among the hot coke C, a baffle plate 102, located between the rear supply vent 206 and the coke C, maintains an open duct 104 by preventing the coke C from clogging the rear supply vent 206. The plate 102 may have spaced holes or nozzles (not shown) to distribute the gas flow (see the arrows in FIG. 4). As suggested above, this baffle and nozzle arrangement can also be employed with indirect cooling for internal gas circulation.

One or more additional baffles, depicted as items 103 in FIGS. 2, 4 and 35 may be employed to prevent the short-circuiting of the gas between the supply vent 206 and the return vent 208. In order to accommodate variations in the height of the charge of coke, the baffles may be in the form of loosely hanging plates of sufficient length to reach the lowest contemplated coke charge. With higher coke charges, the plates will simply deflect rearward, still accomplishing their intended purpose of preventing the short-circuiting of the gas.

The cooling gas may be any gas which will serve to lower the temperature of the coke C without interacting chemically with the coke C, such as nitrogen ($N_2$) and carbon dioxide ($CO_2$). One method of introducing carbon dioxide ($CO_2$) into the system is by placing dry ice in the closed coke box and/or cooling system, whereupon the ($CO_2$) released displaces any air present therein.

The blower 216 forces the cooling gas to circulate within the coke box 10 and to exit at the front return vent 208. After hot gas exits the coke box 10 through the front return vent 208, it travels through a tubular return duct 220 to a vortex separator 202 rigidly attached to the top of the tilt frame 14. The vortex separator 202, is located between the front vent 208 and the heat dissipation tubes 204, such that it does not interfere with the movement of the coke box 10 along the inner frame 50. The vortex separator 202 removes particulate matter from the hot gas before passing clean gas through a second return duct 222 to a series of heat dissipation tubes 204. The dirty particulate matter is collected at the bottom of the vortex separator 202 for later removal.

Figures 39, 40:
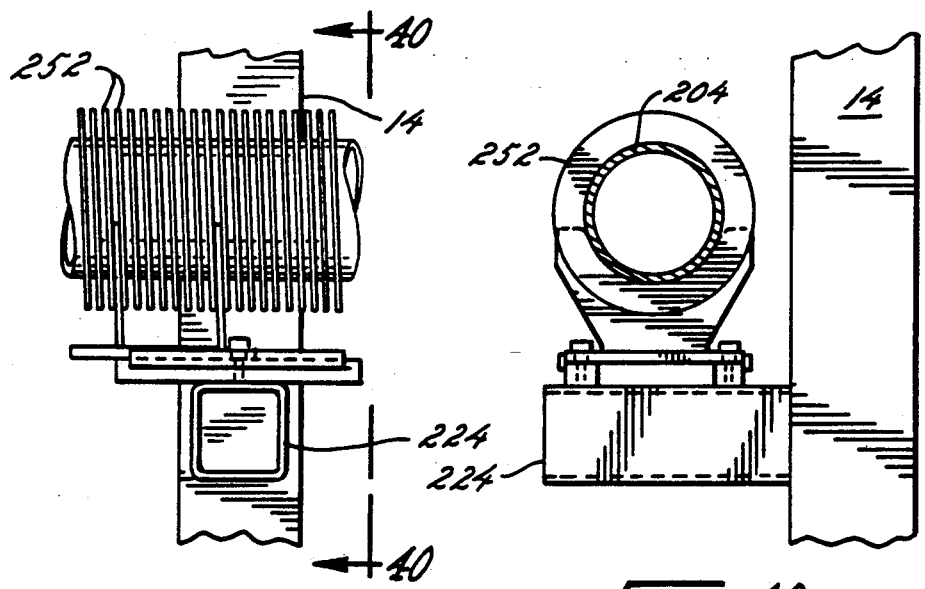
FIG. 39 is an enlarged, fragmentary sectional view of the heat dissipation system taken through plane 39—39 in FIG. 37.
FIG. 40 is an enlarged, fragmentary sectional view of the heat dissipation systems taken through the plane 40—40 in FIG. 40.

In the embodiment shown, a plurality of heat dissipation tubes 204 are attached along the side of the tilt frame 14 by means of side assemblies 224. Referring to FIGS. 39 and 40, the side assemblies 224 are attached to the tilt frame 14 to support the heat dissipation tubes 204. As cooling gas is needed, the blower 216 draws gas from the tubes 204 and circulates the gas through the coke box 10. When the cooling process is finished, the actuators 214 raise the sealing tube structures 200 so that the coke box 10 may be removed.

Figure 38:
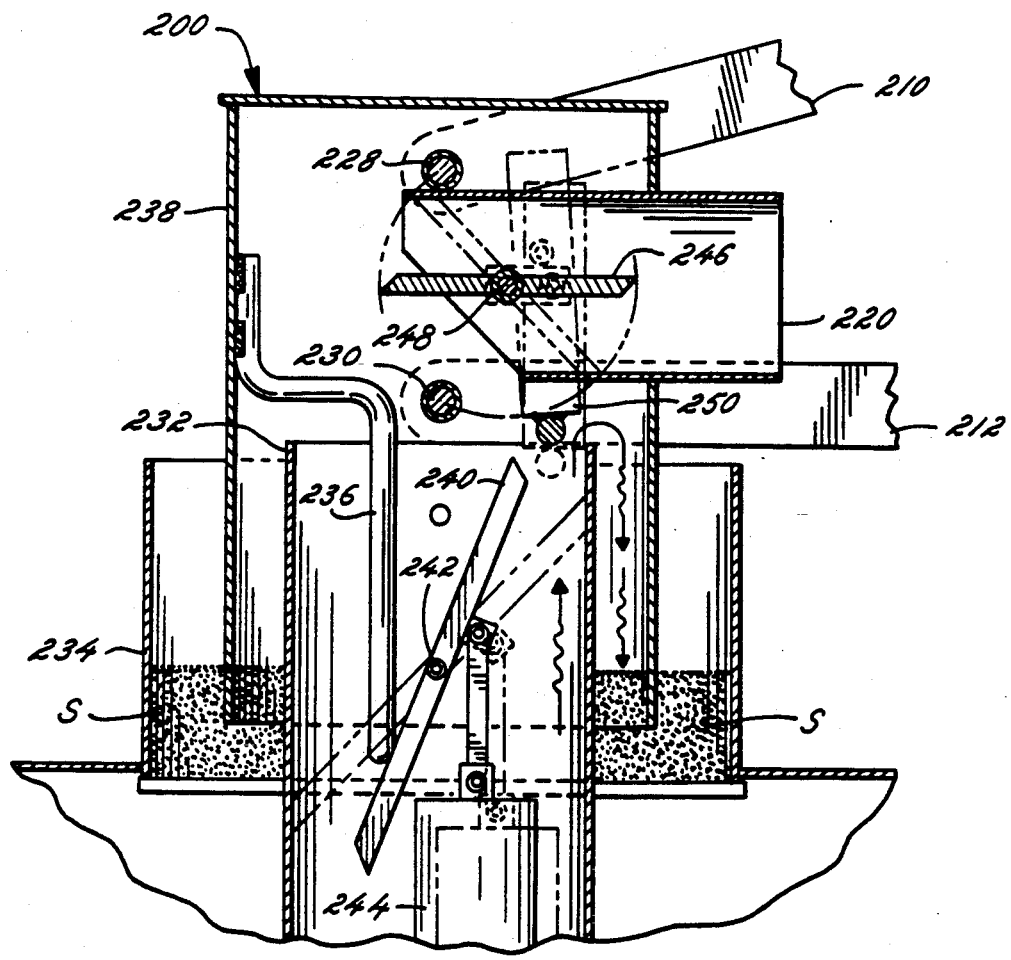
FIG. 38 is an enlarged, fragmentary sectional view of the coke box vent taken through the plane 38—38 in FIG. 36.

Referring to FIG. 38, the upper support arm 210 and the lower support arm 212 are pivotally connected to the circular sealing tube 200 by pins 228 and 230, respectively, located on either side of the sealing tube 200. When the sealing tube 200 is in the lowered position as shown in FIG. 38, the sand S forms a seal and a closed passage between the receiving chamber 86 and the heat dissipation tubes 204 is formed.

The front vent 208 comprises a substantially circular inner tube 232 creating a passage into the receiving chamber 86 and an outer tubular sand reservoir 234 surrounding the inner tube 232. The sealing tube 200 is also substantially tubular to fit between the inner tube 232 and outer sand reservoir 234.

The means for opening the tube 232 to permit the cooling gas to enter and leave the receiving chamber comprises a bar 236 rigidly attached to the interior wall 238 of the sealing tube 200 and a plate 240 pivotally mounted on a pin 242 in the center of the tube 232 such that the bar 236 pushes one end of the plate 240 as the sealing tube 200 is lowered over the tube 232. A weight 244 connected to the other end of the plate 240 forces the plate 240 to close the tube when the sealing tube 200 is raised.

The means for closing the passage to the return duct 220 when the sealing tube 200 is in the raised position comprises an oval plate 246 pivotally mounted on the pin 248 in the center of the return duct 220, and a lever 250 attached to the oval plate 246 such that the plate 246 opens the passage when the lever 250 is lifted and closes the passage when the lever 250 is lowered.

When the sealing tube 200 is lowered over one of the vents, the lever 250 engages the inner tube 232 of the vent 208, forcing the lever 250 to rise and, concomitantly, forcing the plate 246 to open. As the plate 246 opens, cooling gas is permitted to enter the coke box 10. Similarly, when the sealing tube 200 is lifted off the vent 208, the lever 250 falls, causing the plate 246 to close, shutting off the supply of cooling gas to the coke box 10. The oval plate has a truncated outside edge which substantially seals the tube 200 in the closed position.

It will be appreciated that the cooling system shown dissipates the heat from the coke into the atmosphere via fins 252 surrounding the cooling tubes 204. Alternatively, the heat may be recovered for other uses, as, for example, preheating the coking coal, through the use of a heat exchanging arrangement in lieu of the cooling tubes 204.

FIGS. 43a-b, 44a-b, and 45a-b schematically illustrate the sequence of major steps in the preferred operating method of the present invention. For convenience of discussion we will assume that the carrier travels along an east-west line and makes stops at: one of the coke ovens, a coke cooling station and a coke receiving station. Generally, the reference numbers used here are the same as in the previous embodiments, but have been increased by 400.

Figure 43A:
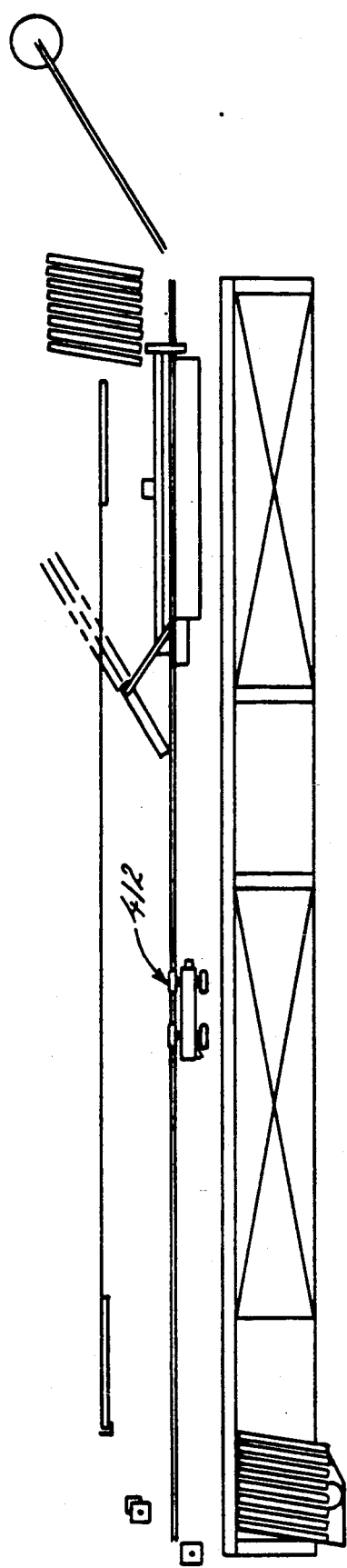
Figure 43B:
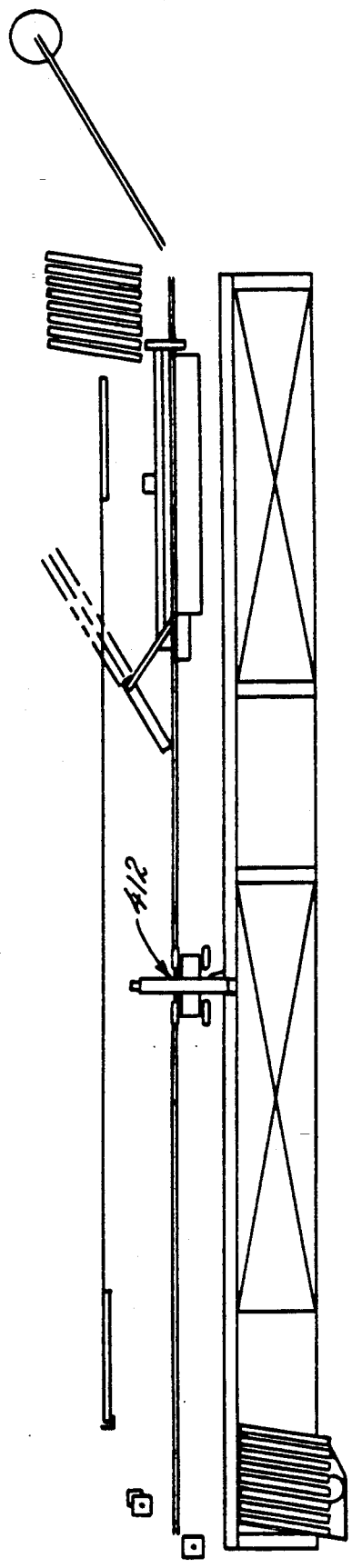

In FIG. 43a the carrier 412 is shown transporting an empty coke box 410 from the coke receiving station (where the coke was dumped from the box) to one of the coke ovens O. FIG. 43b shows in schematic fashion the coke carrier 412 and box 410 aligned at one of the ovens O and taking a "push" of coke. Further details of the sequence of operation with the carrier at the oven and taking a push will be discussed later.

Figure 45A:
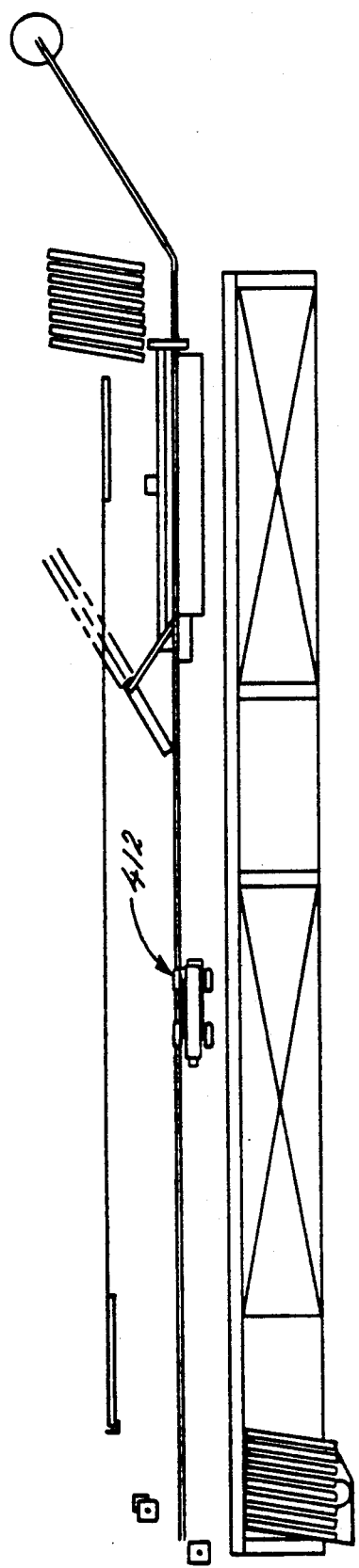
Figure 45B:
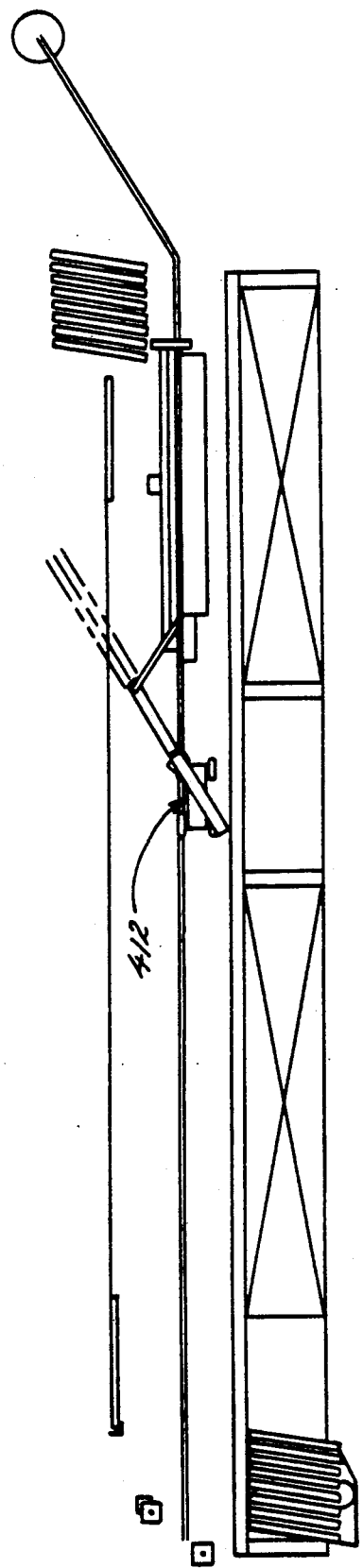

FIG. 44a shows the coke box carrier 412 traveling to a west cooling rack and FIG. 44b shows the carrier at the west cooling rack where the box 410 of hot coke is rolled onto the rack for further cooling and where (after the carrier is repositioned) a box of cooled coke is rolled onto the carrier for transport to a receiving station. FIG. 45a shows the modified coke box carrier 412 transporting the box of cooled coke to the receiving station and FIG. 45b shows the carrier at the receiving station where the coke is dumped down an inclined receiving chute.

Further details in the preferred sequence of operation of the modified coke box carrier will now be discussed. In the following drawings the orientation of the line of travel of the coke box carrier 412 has been changed from horizontally left to right to vertically up and down, thus up is now the westerly direction.

As shown in FIG. 46, the coke box carrier is traveling in the direction of the ovens O. It will be seen here that the coke box 410 is not in superimposed alignment with the line of travel of the carrier 410. Rather, the rotatable coke box supporting frame 416 and the coke box oriented about 12° clockwise with respect to the forward line of travel which, in this case is toward the top of the figure. This places the operator's cab 436 directly in the line of travel and still retains the forward leading edge of the coke box 410 within the overall width dimensions defined by the wheels of the carrier mechanism 412. Thus, a minimum amount of lateral clearance is necessary along the line of travel of the carrier as it travels to and from one of the coke box ovens.

Figure 47A:
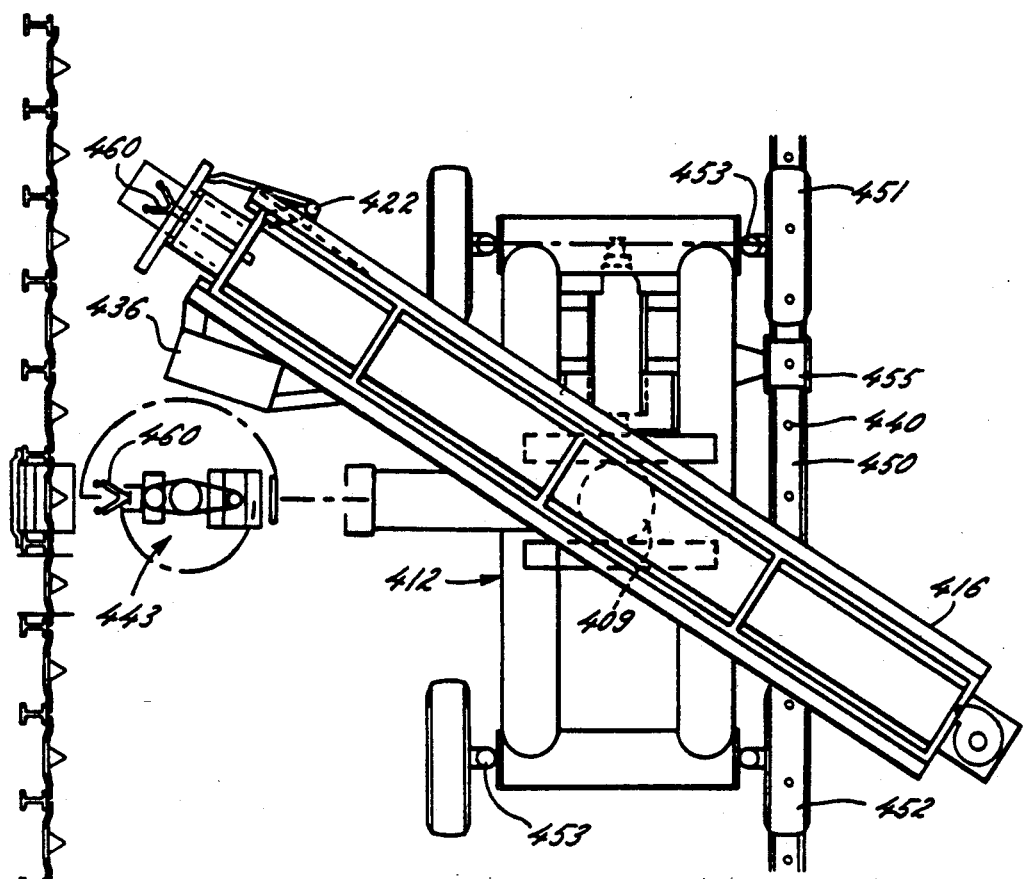

When the coke box carrier arrives at the coke oven from which a charge of coke is to be pushed, it is accurately aligned by means of locator plates 440 embedded in the supporting surface or a supporting rail 450 and a sensing mechanism carried by the coke box carrier 412. Such a position is illustrated in FIG. 47a. It will be seen here that the rotatable coke box carrier frame 416 is rotated from its transport position as seen in the previous FIG. 46, to a position counterclockwise approximately 35° from the line of travel. Also a mechanism 443 for removing the oven door is now directly aligned with the axis of the coke box oven O. The oven door removal mechanism 443 is advanced to the coke box oven where the mechanism centers itself on the oven door and appropriate mechanism is actuated to remove the door from the oven.

Figure 47B:
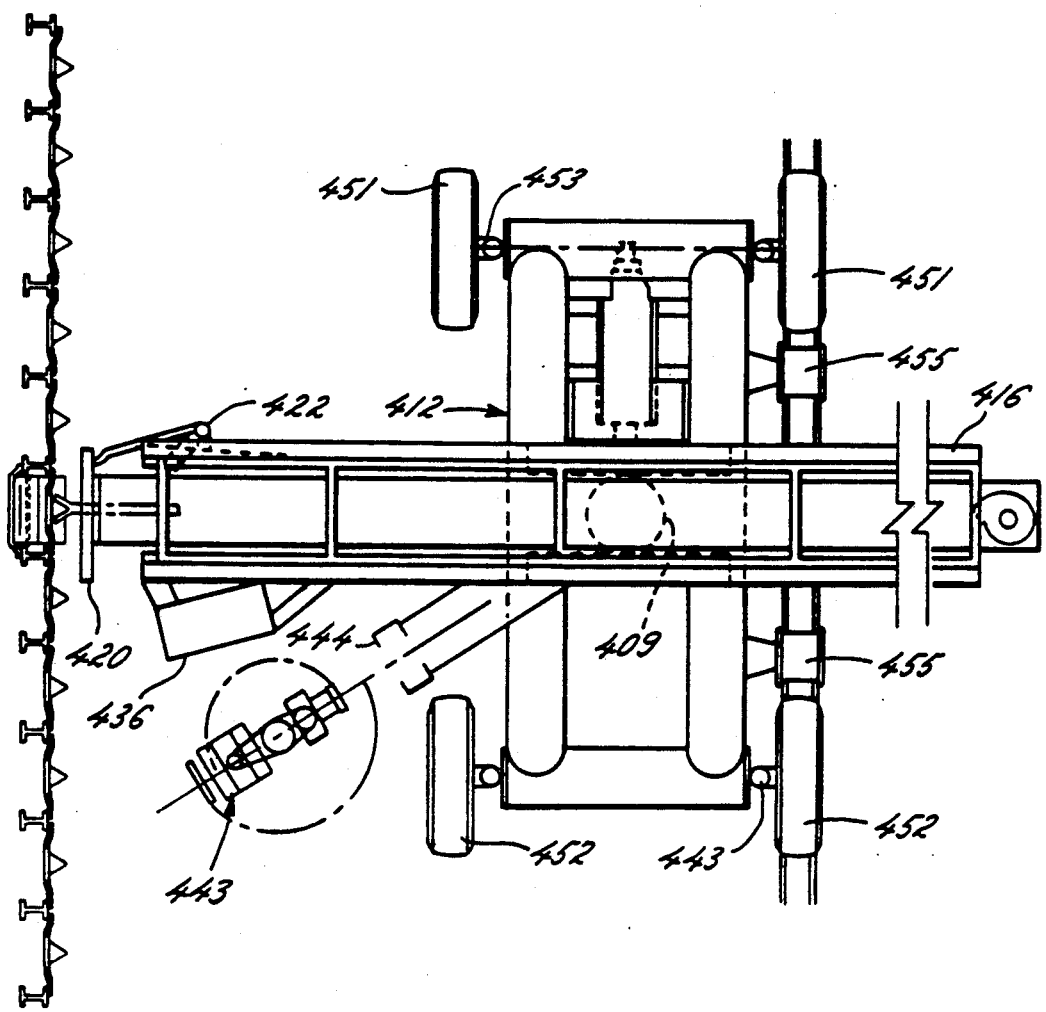

Once the oven door is removed, the removal mechanism 443 is retracted and the turntable 409 of the coke box rotatable carrier is rotated approximately 35° counterclockwise to the position shown in FIG. 47b. At this time the rotatable carrier frame 416 and the tilt frame 414 (see FIG. 53) are positioned so that the coke box 410 is brought into precise alignment with the coke oven axis through a fine adjustment mechanism such as previously described or the modification to be described hereinafter. The coke box 410 is then advanced until the compression sealing mechanism described above seals with the door jamb of the oven.

Figure 47C:
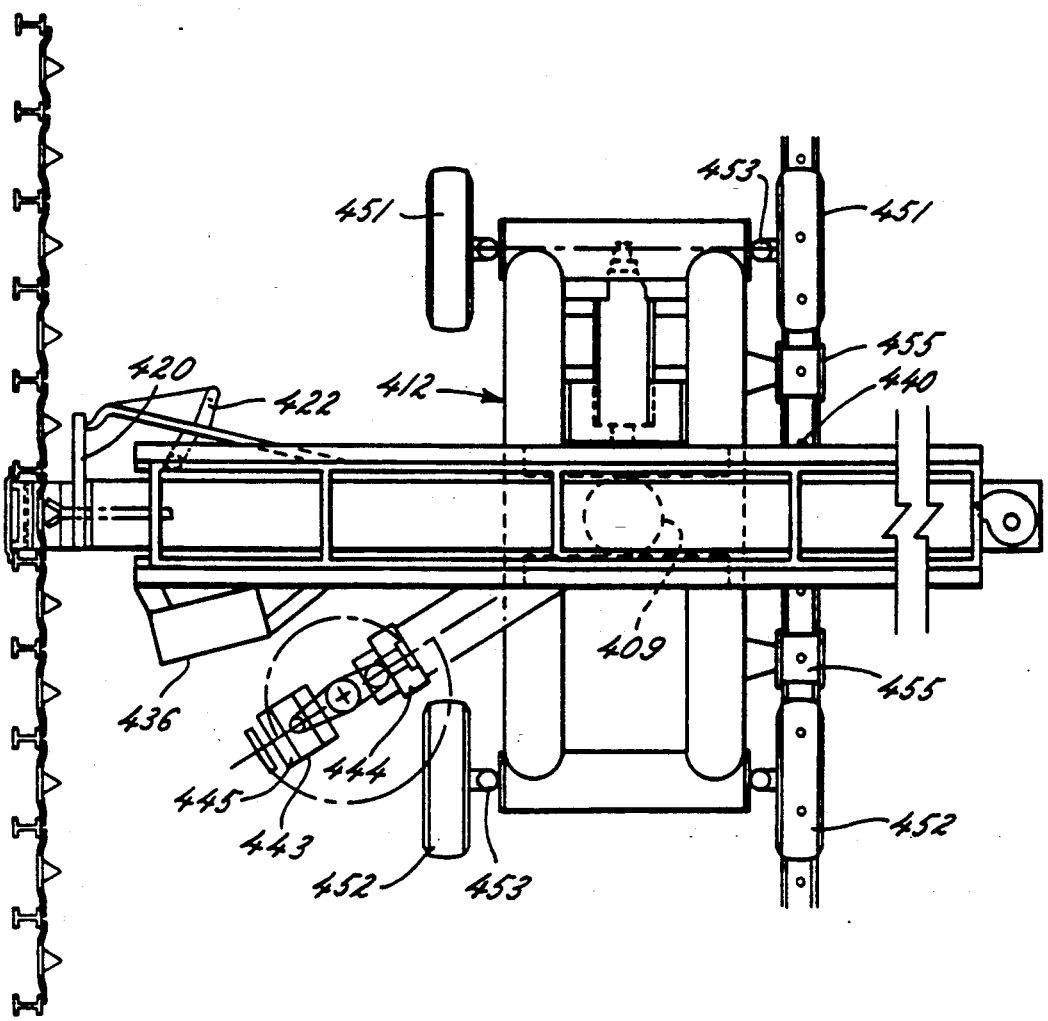
Figure 47D:
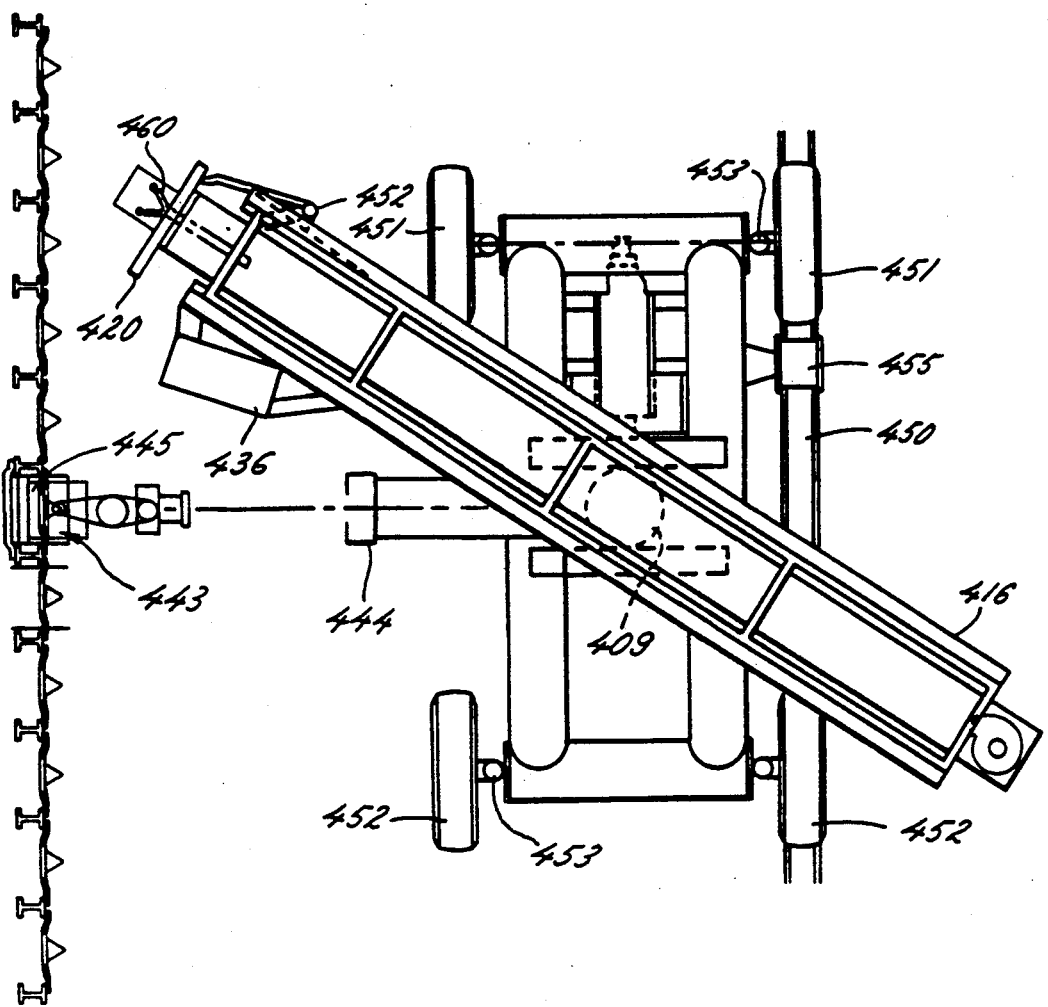

When the cross oven signaling system is in operation as described heretofore, the door 420 of the coke box is open through the mechanism 422 as shown in FIG. 47c. The operator then energizes the pushing ram R and a charge of coke C is pushed into the box 410 securely attached to the coke box carrier 412 in a manner such as previously discussed. Concurrently with the push of coke into the coke box, the oven door is rotated 180° and brought into engagement with a door cleaning mechanism located on the removal and insertion probe 443 and shown schematically at 444 in FIGS. 47b and c.

Upon completion of the push of coke into the coke box, the box door 420 is closed with the mechanism 422 and the box 410 is retracted from the oven door jamb. The carrier turntable 409 then is rotated approximately 35° to the position shown in FIG. 47d. Also, this brings the door probe mechanism 443 into alignment with the coke oven axis and a door jamb cleaning mechanism 445 is advanced to clean the door jamb. Once this is done, the jamb cleaner is retracted and the door handling mechanism 443 is rotated back 180° from the cleaning position and the oven door is then reattached to the face of the coke oven O. Once the door is reattached to the oven face F, the door removal probe 443 is retracted to its normal position, ready for the turntable 409 to complete rotation clockwise to the transport position.

FIG. 48 now shows the coke box turntable 409 rotated into the transport position and the coke box carrier 412 traveling to one of the cooling racks. Again, it will be noted that the transport position disposes the coke box 410 slightly clockwise from the axis of the carrier mechanism 412 to place all of the working elements of the rotatable frame 416 within the lateral dimensions of the wheels of the carrier 412.

When the carrier arrives at the cooling rack it is preliminarily aligned at the desired open rack by means of the locator plates 440 installed in the supporting rail 450 and the plate sensing mechanism carried on the carrier mechanism 412. This is the disposition as shown in FIG. 49 where the coke box carrier turntable 409 has been rotated into alignment at the cooling rack and the coke box 410 is being shifted into one of the open slots contained within the cooling rack frame. Preliminary to pushing the coke box out of the carrier mechanism, of course, it is first necessary to disengage the coke box door from its closer mechanism 422 carried on the supporting tilt frame 414. The coke box 410 is then rolled out of the tilt frame 414 such as by the mechanism previously described herein.

It will be apparent from the preceding discussion that while the coke box 410 is located in the cooling rack it is continuously flushed with cooling water so as to bring the coke within the box down to the desired temperature, well below its ignition temperature. After the coke box is installed in the cooling rack, the carrier mechanism 412 is relocated in alignment with one of the cooled coke boxes 410 where that coke box is rolled onto the carrier for transport to the coke receiving station. The mechanism for loading the coke box 410 onto the carrier 412 has been previously discussed and will not be repeated here.

In FIG. 50 the modified coke box carrier is shown traveling to the receiving station. It will be seen that the turntable mechanism 409 is rotated 180° so that the operator's cab 436 now appears at the bottom of this figure. It will again be seen that the coke box 410 and the door removal mechanism 422 are located within the overall width of the carrier mechanism 412 as the carrier travels toward the receiving station.

When the coke box carrier arrives at the receiver station, it is again aligned with the receiver chute by means of locator plates 440 embedded in the supporting surface or rail 450 and the plate sensor carried on the carrier mechanism 412. The coke box is aligned with the mouth of the receiver station as is shown in the plan view of FIG. 51 and in the side elevation view in FIG. 52.

The receiver station includes an inclined chute CH with a receiving hood H coupled to it. The receiving hood has an entrance door ED which is closed prior to engagement with the discharge end of the coke box 410. Once the coke box is properly positioned and sealed to the hood H of the receiver station, the coke box door 420 and the hood entrance door ED are opened and the coke box elevating mechanism previously described herein is energized to tilt the carrier frame upwardly as shown in FIG. 53. It will also be appreciated that the coke slides down through the receiving hood H into the coke box chute CH by gravity. Should there be any coke in the box that is stuck to the interior surface, a spatula pusher mechanism 447 is provided at the rear of the coke box 410 in order to urge the coke forwardly and down the inclined floor of the box into the receiver chute.

Within the receiver chute CH the coke continues to slide forward and downwardly by the force of gravity and is engaged by a coke sizing mechanism M which cuts off the forward or leading portion of the coke cake C and discharges it on to an upwardly inclined conveyor belt. The coke then is conveyed away from the receiving station into a conventional storage area.

It is another important feature of the invention, and particularly in the alternate preferred embodiment shown in FIGS. 43-53 of the drawings, that a guide and supporting rail system is provided for the modified carrier 412. More specifically, the guide rail system includes at least one elongated guide rail 450 which extends along and perpendicular to the axes of coke ovens O from at least the cooling station to the coke receiving station.

Turning to FIGS. 46-51, it will also be seen that the carrier vehicle includes a pair of front wheels 451 and a pair of rear wheels 452. In the preferred embodiment, all four wheels are steerable and elevatable by means of hydraulic jacks 453 such as previously described herein. At least one pair of wheels, in this instance the front wheels 451, are selectively coupled to a power source such as a diesel or gas engine and a suitable transmission for driving the carrier.

Also in keeping with the invention, the carrier 412 is provided with at least a pair of rail engaging wheels 455 which may be brought into engagement with the guide rail 450 to guide and support the side of the carrier 412 opposite from the ovens O. It will also be understood that when the right hand hydraulic cylinders 453 are extended, the rail engaging wheels 455 are lifted off the rail 450 and the vehicle is free to travel on the front and rear wheel pairs 451, 452. This permits self-propelled travel of the carrier to other locations such as for example, to a work shop or maintenance shed when desired.

It will also be appreciated that the left hand hydraulic cylinders 453 can be extended to raise the rotatable main frame 416 so that it may be rotated over the coke oven bench and bring the coke box 410 into alignment with one of the coke ovens O. Then the left hand cylinders can be retracted to lower the rotatable carrier frame 416 directly onto the oven bench prior to a push of coke into the box 410. Additionally, the rail-engaging wheels 455 not only accurately vertically support the other side of the carrier 412 with respect to the coke oven O, but also resist the lateral force exerted on the carrier by the friction generated as the coke is pushed into the box 410.

An alternative fine location mechanism 460 is shown in FIG. 59. Basically, it comprises a bifurcated or U-grooved fork 461 which is engageable with a similarly shaped U-guide located on the face F of each oven O. Suitable micro-switches are coupled to the fork 461 to control the lateral shifting of the tilt frame 414 relative to the rotatable main frame 416 so as to accurately align the coke box with the oven axis. A similar fine tuning mechanism may also be used to center the oven door handling probe 443.

We claim as our invention:

1. A coke box for dry quenching a charge of coke received from the discharge end of a coke oven comprising, in combination,
   a chamber for receiving a charge of coke, said receiving chamber formed of metal panels having an exterior surface, and an interior shape and a volume in substantially the form of a rectangular parallelepiped substantially equal to that of the shape and volume of the charge of coke, the receiving chamber having a top, a bottom, and opposite sides, a rear end and a door opening,
   door means for selectively closing the door opening to enclose the coke within the receiving chamber to substantially isolate the coke from the atmosphere and external cooling media,
   means for cooling the exterior surface of the receiving chamber to indirectly cool the charge of coke by passing an external cooling media over the exterior surfaces of the receiving chamber,
   means for creating an effective seal between the discharge end of the coke oven and the receiving chamber to substantially prevent the escape of combustible gases and particulate matter therefrom,
   means defining a burner chamber for burning combustible gases and particulate matter exhausted from the receiving chamber,
   and means interconnecting the receiving chamber of the coke box and the burner chamber for communicating combustible gases and particulate matter from the receiving chamber into the burner chamber.

2. A coke box according to claim 1 wherein the interconnecting means includes means for controlling the flow of combustible gases from the receiving chamber into the burner chamber.

3. A coke box according to claim 1 wherein the burner chamber includes a venturi burner tube for mixing atmospheric air with the combustible gases to promote and enhance the combustion thereof.

4. A coke box according to claim 3 wherein the venturi burner tube includes means defining a plurality of air aspirating inlet nozzles wherein the internal cross-section of the venturi tube is reduced adjacent the means defining the inlet nozzles for drawing atmospheric air into the venturi burner tube.

5. A coke box according to claim 4 wherein the plurality of inlet nozzles are disposed in circumferentially staggered relationship along at least a portion of the effective length of the venturi tube.

6. A coke box according to claim 1 wherein the sealing means comprises a plurality of sealing members coupled to the panels of the receiving chamber and extending around the circumference of the door opening of the receiving chamber and springs connected to the panels for urging the sealing members against the discharge end of the coke oven.

7. A coke box according to claim 1 wherein the door means comprises a hollow door plate having a water inlet, a water outlet and an internal chamber to permit water flow through the internal chamber to maintain the door within acceptable temperature limits.

8. A coke box according to claim 1 wherein the means for cooling the exterior surface of the receiving chamber includes means for directing water from a source located above and outside the receiving chamber so that the water flows over and down the exterior surfaces of the panels.

9. A coke box according to claim 1 including a blower mounted on the coke box for exhausting air, combustible gases and particulate matter from the receiving chamber.

10. A coke box according to claim 1 including actuating means coupled to the coke box for opening the door means of the receiving chamber to permit removal of the coke from the receiving chamber.

11. A coke box according to claim 1 including tilt means coupled to the coke box for inclining the receiving chamber to cause the coke to slide out of the door opening of the receiving chamber.

12. A coke box according to claim 1 including vibrating means coupled to the coke box for assisting in the removal of the coke from the receiving chamber by mechanically vibrating one of more of the exterior surfaces of the receiving chamber.

13. A coke box according to claim 1 including scraping means coupled to the coke box for assisting in the removal of the coke from the receiving chamber by scraping any remaining coke therefrom.

14. A coke box according to claim 1 including means coupled to the coke box for aligning the door opening of the receiving chamber with the discharge end of the coke oven.

15. A coke box according to claim 14 wherein the aligning means includes means for sensing the location of a reference point having a known spacial relation to the discharge end of the coke oven.

16. A coke box according to claim 15 wherein the aligning means operates in response to the means for sensing the location of the reference point so as to align the sealing means of the receiving chamber with the discharge end of the coke oven.

17. A coke box according to claim 1 including engaging means coupled to the coke box for securing the receiving chamber in alignment with the discharge end of the coke oven so as to prevent relative movement between the receiving chamber and the coke oven while the charge of coke is pushed into the receiving chamber.

18. A coke box for dry quenching a charge of coke received from the discharge end of a coke oven comprising, in combination, a chamber for receiving a charge of coke, said receiving chamber formed of metal panels having an exterior surface, and an interior shape and a volume in substantially the form of a rectangular parallelepiped substantially equal to that of the shape and volume of the charge of coke, the receiving chamber having a top, a bottom, and opposite sides, a rear end and a door opening, door means for selectively closing the door opening to enclose the coke within the receiving chamber to substantially isolate the coke from the atmosphere and external cooling media, means for cooling the exterior surface of the receiving chamber to indirectly cool the charge of coke by passing an external cooling media over the exterior surfaces of the receiving chamber, means for creating an effective seal between the discharge end of the coke oven and the receiving chamber to substantially prevent the escape of combustible gases and particulate matter therefrom, means defining a burner chamber for burning combustible gases and particulate matter exhausted from the receiving chamber, means interconnecting the receiving chamber and the burner chamber for communicating combustible gases and particulate matter from the receiving chamber into the burner chamber, the interconnecting means including means for controlling the flow of combustible gases from the receiving chamber into the burner chamber and the burner chamber including means for mixing atmospheric air with the combustible gases to promote and enhance the combustion thereof.

19. A coke box for dry quenching a charge of coke received from the discharge end of a coke oven comprising, in combination, a chamber for receiving a charge of coke, said receiving chamber formed of metal panels having an exterior surface, and an interior shape and a volume in substantially the form of a rectangular parallelepiped substantially equal to that of the shape and volume of the charge of coke, the receiving chamber having a top, a bottom, and opposite sides, a rear end and a door opening, door means for selectively closing the door opening to enclose the coke within the receiving chamber to substantially isolate the coke from the atmosphere and external cooling media, means for cooling the exterior surface of the receiving chamber to indirectly cool the charge of coke by passing an external cooling media over the exterior surfaces of the receiving chamber, means for creating an effective seal between the discharge end of the coke oven and the receiving chamber to substantially prevent the escape of combustible gases and particulate matter therefrom, the sealing means including a plurality of sealing members coupled to the panels of the receiving chamber and extending around the circumference of the door opening of the receiving chamber and springs connected to the panels for urging the sealing members against the discharge end of the coke oven, means defining a burner chamber for burning combustible gases and particulate matter exhausted from the receiving chamber, means interconnecting the receiving chamber of the coke box and the burner chamber for communicating combustible gases and particulate matter from the receiving chamber into the burner chamber, and means coupled to the coke box for securing the receiving chamber in alignment with the discharge end of the coke oven so as to prevent relative movement between the receiving chamber and the coke oven while the charge of coke is pushed into the receiving chamber.

20. A coke box according to claim 19 wherein the door means comprises a hollow door plate having a water inlet, a water outlet and an internal chamber to permit water flow through the internal chamber to maintain the door within acceptable temperature limits, and the means for cooling the exterior surface of the receiving chamber includes means for directing water from a source located above and outside the receiving chamber so that the water flows over and down the exterior surfaces of the panels.

* * * * *